United States Patent
Huber et al.

(10) Patent No.: US 12,118,485 B2
(45) Date of Patent: *Oct. 15, 2024

(54) COMPUTER SYSTEM AND METHOD FOR TRACKING THE IMPACT OF A CHANGE EVENT

(71) Applicant: Procore Technologies, Inc., Carpinteria, CA (US)

(72) Inventors: Ryan Huber, Santa Barbara, CA (US); Julia Mary Nisbet, Goleta, CA (US)

(73) Assignee: Procore Technologies, Inc., Carpinteria, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/887,888

(22) Filed: Aug. 15, 2022

(65) Prior Publication Data
US 2023/0041586 A1 Feb. 9, 2023

Related U.S. Application Data

(63) Continuation of application No. 16/740,069, filed on Jan. 10, 2020, now Pat. No. 11,416,793.

(51) Int. Cl.
*G06Q 10/06* (2023.01)
*G06Q 10/0631* (2023.01)
*G06Q 50/08* (2012.01)

(52) U.S. Cl.
CPC ....... *G06Q 10/06313* (2013.01); *G06Q 50/08* (2013.01)

(58) Field of Classification Search
CPC ..................................................... G06Q 10/06
See application file for complete search history.

(56) References Cited

U.S. PATENT DOCUMENTS

| 8,015,113 B2 | 9/2011 | Petersen et al. |
| 2002/0087449 A1 | 7/2002 | Como |

(Continued)

FOREIGN PATENT DOCUMENTS

| KR | 10-2011-0093718 A | 8/2011 | |
| WO | WO-2016004132 A1 * | 1/2016 | ............. G06F 17/40 |

OTHER PUBLICATIONS

Abioye, Sofiat O. et al., "Artificial Intelligence in the Construction Industry: A Review of Present Status, Opportunities and Future Challenges", Journal of Building Engineering, vol. 44, Oct. 5, 2021. (Year: 2021).*

(Continued)

*Primary Examiner* — Kurtis Gills
(74) *Attorney, Agent, or Firm* — Lee Sullivan Shea & Smith LLP

(57) ABSTRACT

Disclosed herein is a software application for tracking the impact of a change event on a budget for a project. In one aspect, a computing system may receive user input defining a given change event that comprises a line item, and setting an estimated revenue for the line item to a dynamic amount that is to track a most-firm cost for the first line item. Based on the received user input and the estimated revenue for the line item, the computing system may create a data record that represents the given change event, detect a more-firm cost available for the line item, and based on detecting the more-firm cost available for the line item, (i) determine an updated most-firm cost for the line item and (ii) determine an updated estimated revenue for the line item to track the updated most-firm cost for the line item.

20 Claims, 10 Drawing Sheets

(56) References Cited

U.S. PATENT DOCUMENTS

| | | | |
|---|---|---|---|
| 2004/0088233 A1* | 5/2004 | Brady | G06Q 40/123 |
| | | | 705/31 |
| 2008/0027861 A1 | 1/2008 | Gendler | |
| 2008/0270256 A1* | 10/2008 | Caballero | G06Q 40/12 |
| | | | 705/26.81 |
| 2010/0017255 A1 | 1/2010 | Gramza et al. | |
| 2010/0088240 A1 | 4/2010 | Ely et al. | |
| 2010/0191611 A1* | 7/2010 | Biro | G06Q 30/0601 |
| | | | 705/26.1 |
| 2014/0229213 A1* | 8/2014 | Matthews | G06Q 10/20 |
| | | | 705/7.15 |
| 2016/0086295 A1 | 3/2016 | Cohen et al. | |
| 2016/0132907 A1* | 5/2016 | DiTomasso | G06Q 30/0202 |
| | | | 705/7.31 |
| 2016/0162829 A1* | 6/2016 | Bellini, III | G06Q 30/0635 |
| | | | 705/7.17 |
| 2016/0210572 A1* | 7/2016 | Shaaban | G06Q 40/12 |
| 2017/0011318 A1* | 1/2017 | Vigano | G06N 20/00 |
| 2017/0308064 A1* | 10/2017 | Platt | G06F 30/00 |
| 2020/0042938 A1* | 2/2020 | Goncalves | G06Q 30/0611 |

OTHER PUBLICATIONS

Abioye et al., "Artificial Intelligence in the Construction Industry: A Review of Present Status, Opportunities and Future Challenges", Journal of Building Engineering, vol. 44, Oct. 5, 2021, 13 pages.
International Searching Authority Written Opinion mailed on May 12, 2021, issued in connection with International Application No. PCT/US2021/012939, filed Jan. 11, 2021, 8 pages.

* cited by examiner

COMPUTER SYSTEM AND METHOD FOR TRACKING THE IMPACT OF A CHANGE EVENT

CROSS-REFERENCE TO RELATED APPLICATIONS

This application is a continuation of, and claims priority to, U.S. Non-provisional application Ser. No. 16/740,069, filed on Jan. 10, 2020, and titled "Computer System and Method for Tracking the Impact of a Change Event," which is herein incorporated by reference in its entirety.

BACKGROUND

Construction projects can be massive endeavors involving multiple different parties. For instance, there may be a client who is funding the project, a general contractor ("GC") who manages the overall construction project, and numerous subcontractors who provide goods and/or services to the GC to complete the project. Typically, a client may enter into a "prime contract" with a GC that outlines a scope of the construction project and the fees that the client will pay to the GC. In turn, a GC may enter into subcontracts with various different subcontractors to work on various different aspects of the construction project. For example, a GC may engage a first subcontractor to handle a first aspect of the construction project (e.g., provide goods and/or services for concrete work), a second subcontractor to handle a second aspect of the construction project (e.g., provide goods and/or services for carpentry work), and so on.

Generally speaking, managing a construction project to completion is a complex endeavor. For example, a construction project may require a plan to allocate the project's budget by providing cost estimates for labor, equipment, and materials, which may be used to monitor and control the overall costs associated with the construction project. In practice, during the course of a construction project, an unplanned—for event may arise that may require additional labor, equipment, and/or materials, and thus, affect the project's plan and costs. For instance, a client may request a design change (e.g., a request to paint the building in a different color), a design flaw may be discovered, or an incident may occur that causes damage to a construction building and/or materials. In some instances, such events may be within the scope of a prime contract entered between a GC and a client but may not have been previously accounted for in the construction project's plan, in which case the cost associated with the event may typically be covered by the GC. In other instances, such events may be out of scope of a prime contract (e.g., a client's request for a design change) and thus may not have been previously accounted for in the construction project's plan. In such instances, the additional cost associated with the event may typically be paid for in whole or in part by the client.

Unfortunately, implementing a change associated with an unplanned-for event can be inefficient and cumbersome, as it may require coordination between multiple parties (e.g., the GC, the client, and/or one or more subcontractors) to estimate, review and/or approve costs and revenues associated with implementing the change, and track the impact of the unplanned-for event on the plan and overall budget for a construction project.

Overview

In view of the foregoing, a "change event" may be created to implement changes associated with an unplanned-for event that may require additional labor, equipment, and/or materials. A change event that may be created to implement changes associated with an unplanned-for event may take various forms.

For instance, the change event may comprise one or more "line items" that each specify a particular work activity that is to be performed in connection with the change event. Each such line item may be comprised of various types of information, examples of which may include a "cost code" (or the like) that identifies a type of work activity that is the subject of the line item (e.g., concrete work, carpentry work, electrical work, etc.), a "cost type" (or the like) that identifies a type of cost (e.g., labor, equipment, material, commitment etc.) to be incurred when performing the work activity that is the subject of the line item, a description of the work activity that is the subject of the line item, a company (or "vendor") that is to perform the work activity that is the subject of the line item, a contact with which the line item is associated, an estimated cost to complete the work activity that is the subject of the line item, and an estimated revenue that reflects how much a GC of the construction project (or the like) expects to get paid by a client of the construction project (or the like) for completing the work activity that is the subject of the given line item (which may depend in part on whether the work activity is in scope or out of scope of the prime contract for the construction project), among other possible types of information. An estimated cost of a line item may at times be referred to herein as a cost Rough Order of Magnitude ("ROM") cost, and an estimated revenue of a line item may at times be referred to herein as a revenue ROM.

In practice, after a change event has been created, one or more line items of the change event may progress through various different stages that may be associated with cost or revenue amount that is "more firm" (i.e., a cost or revenue amount that is more likely to end up as the final cost or revenue amount for the line item) than the estimated cost or revenue amount specified at an earlier time, such as the time the change event is created (or soon after the change event is created).

For instance, after a given line item is created as part of the change event, a GC may send a Request for Quote ("RFQ") to one or more potential subcontractors (e.g., an existing subcontractor on the project or possibly a new subcontractor), each potential subcontractor may submit a bid in response to the RFQ that includes a quoted cost to complete the work activity that is the subject of the given line item, and the GC may negotiate with a given potential subcontractor regarding the given potential subcontractor's quoted cost and eventually select a particular one of the received bids to pursue further (e.g., the bid having the lowest quoted cost)—which may establish an "RFQ" cost amount for the given line item that is more firm than the estimated cost specified at an earlier time (e.g., when the given line item was created).

In turn, the GC may enter into a new subcontract or amend an existing subcontract to complete the work activity that is the subject of the given line item with the subcontractor that submitted the selected bid—which may then establish a "Commitment" cost amount for the given line item that is more firm than both the estimated cost for the given line item was created and the RFQ cost for the given line item.

Thereafter, it is possible that the given line item may be included in a newly-created "change order" that describes the details for completing the work activity that is the subject of the given line item (including the revenue the GC expects to get paid by the client) to the client of the construction project (and/or an architect, engineer (or the like) employed by the client), which may establish a "Change Order" revenue for the given line item that is more firm than the estimated revenue specified at an earlier time (e.g., when the given line item was created).

The given line item of the change event may progress through various other stages as well.

Based on the foregoing, it will be appreciated that more-firm cost and revenue amounts may become available for the given line item as the given line item progresses through these different stages, which may result in an update to what is considered to be the "most-firm" cost amount or the "most-firm" revenue amount available for the given line item. For example, after an RFQ cost amount is established for the given line item as described above, this may become the most-firm cost amount for the given line item. As another example, after a Commitment cost amount is established for the given line item as described above, this may become the most-firm cost amount for the given line item. As yet another example, after a Change Order revenue amount is established for the given line item as described above, this may become the most-firm revenue amount for the given line item. Other examples are possible as well.

However, existing approaches for establishing and tracking the cost and revenue amounts (e.g., most-firm cost amounts and most-firm revenue amounts) for a change event's one or more line items have many limitations. For instance, while some existing software applications function to establish and track the cost and revenue amounts for a change event's one or more line items, these software applications are very rudimentary in nature. Indeed, these existing software applications generally provide a "spreadsheet-style" user interface that requires a user to manually input cost and revenue amounts for a change event's one or more line items (including most-firm cost amount and most-firm revenue amount for each line item), and manually update the cost and revenue amounts for the change event's one or more line items each time a more-firm cost or more-firm revenue is available for a given line item of the change event. This gives rise to several problems.

First, manual input of cost and revenue amounts for a change event's one or more line items is inefficient, cumbersome, and susceptible to errors, especially when several line items are included as part of the change event. Second, manual update of cost and revenue amounts for a change event's one or more line items is also inefficient, cumbersome, and susceptible to errors. Third, in some instances, a user may forget to update cost and/or revenue amounts when a more-firm cost amount and/or more-firm revenue amount is available. As a result, the most-firm cost amount and/or the most-firm revenue amount for a given line item of the change event may be outdated and may not accurately reflect the latest cost and/or revenue amounts available for the given line item.

To help address these and other problems, disclosed herein is an improved software application for tracking the impact of a change event on a budget for a construction project, in terms of both the cost associated with the change event and the revenue associated with the change event. In this respect, the disclosed software application may enable a user to track both cost and revenue amounts of a change event associated with a construction project.

In one aspect, as noted above, the disclosed software application may provide improved techniques for setting and tracking an estimated revenue for one or more line items of a change event. For instance, as an initial matter, the disclosed software application may enable an estimated revenue for a given line item of a change event to be set to either (i) a static amount or (ii) a dynamic amount that tracks a most-firm cost that is available for the given line item, such that the estimated revenue amount for the given line item is updated to mirror the most-firm cost amount, which may change at various stages described above. The disclosed software application may enable the estimated revenue for the given line item included as part of the change event to be set in various manners described in more detail below.

In another aspect, the disclosed software application may function to determine markup amounts associated with a change event and present such markup amounts to a user. Generally speaking, a change event may be associated with estimated markup amounts that are established at the time the change event is created (or some time after the change event is created). Each estimated markup amount may represent a respective type of markup fee that represents a type of commission (e.g., insurance, overhead, profits, sales tax, etc.) that the GC expects from the client of the construction project (or the like) in connection with the change event. As disclosed herein, more-firm markup amounts may become available as a given line item of the change event progresses through different stages, such as markup amounts that become available when the given line item of the change event is included in a change order, which may eventually result in an update to the most-firm markup amounts for the change event. In this respect, a respective markup amount for each type of markup fee may be associated with a respective markup variable, such as an estimated revenue markup variable that may be associated with the respective estimated markup amount for each type of markup fee, a change order revenue markup variable that may be associated with the respective markup amount for each type of markup fee that becomes available when a given line item of a change event is included in a change order, and a most-firm revenue markup variable that may be associated with the respective most-firm markup amount for each type of markup fee. Each of these markup variables are described in more detail below.

In yet another aspect, the disclosed software application may function to provide an up-to-date estimate of the overall budget for a construction project. For instance, for each change event created for the construction project, the most-firm cost amount and/or the most firm revenue amount for each line item of the change event may serve as input to a "Budgeting" tool of the disclosed software application, which may be used to provide an up-to-date estimate of the overall budget for the construction project. In line with the discussion above, the overall budget for the construction project may be updated dynamically as a most-firm cost amount and/or a most-firm revenue amount for a given line item of a given change event becomes available.

Accordingly, in one aspect, disclosed herein is a method that involves a computing system (1) receiving, from a client station, user input defining a given change event that comprises a first line item, (2) setting an estimated revenue for the first line item to a dynamic amount that is to track a most-firm cost for the first line item, (3) based on the received user input and the estimated revenue for the first line item, creating a data record that represents the given change event, (4) detecting a more-firm cost available for the first line item, and (5) based on detecting the more-firm cost available for the first line item, (i) determining an updated most-firm cost for the first line item and (ii) determining an updated estimated revenue for the first line item to track the updated most-firm cost for the first line item.

In another aspect, disclosed herein is a computing system that includes a network interface, at least one processor, a non-transitory computer-readable medium, and program instructions stored on the non-transitory computer-readable medium that are executable by the at least one processor to cause the computing system to carry out the functions disclosed herein, including but not limited to the functions of the foregoing method.

In yet another aspect, disclosed herein is a non-transitory computer-readable storage medium having program instructions stored thereon that are executable to cause a computing system to carry out the functions disclosed herein, including but not limited to the functions of the foregoing method.

One of ordinary skill in the art will appreciate these as well as numerous other aspects in reading the following disclosure.

BRIEF DESCRIPTION OF THE DRAWINGS

FIG. 4 depicts an example user-interface view for creating a change event that may be presented to a client station.

FIG. 5A depicts an example user-interface view of a change event that may be presented to a client station.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

I. EXAMPLE SYSTEM CONFIGURATION

As discussed above, disclosed herein is an improved software application for tracking the impact of a change event on a budget for a construction project, in terms of both the cost associated with the change event and the revenue associated with the change event. Although the disclosed software application is described herein with respect to a construction project, one of ordinary skill in the art will appreciate that the disclosed software application may be used for tracking the impact of a change event on a budget for various other types of projects as well. In this respect, the disclosed software application may include various aspects and take various forms.

In one aspect, the disclosed software application may take the form of a software as a service ("SaaS") application that comprises a front-end software component running on a user's client station (e.g., a client station associated with either an employee of the GC, a subcontractor, or the client of the construction project, etc.), and a back-end software component running on a back-end platform that is accessible to the user's client station via a communication network (e.g., the Internet).

Figure 1:
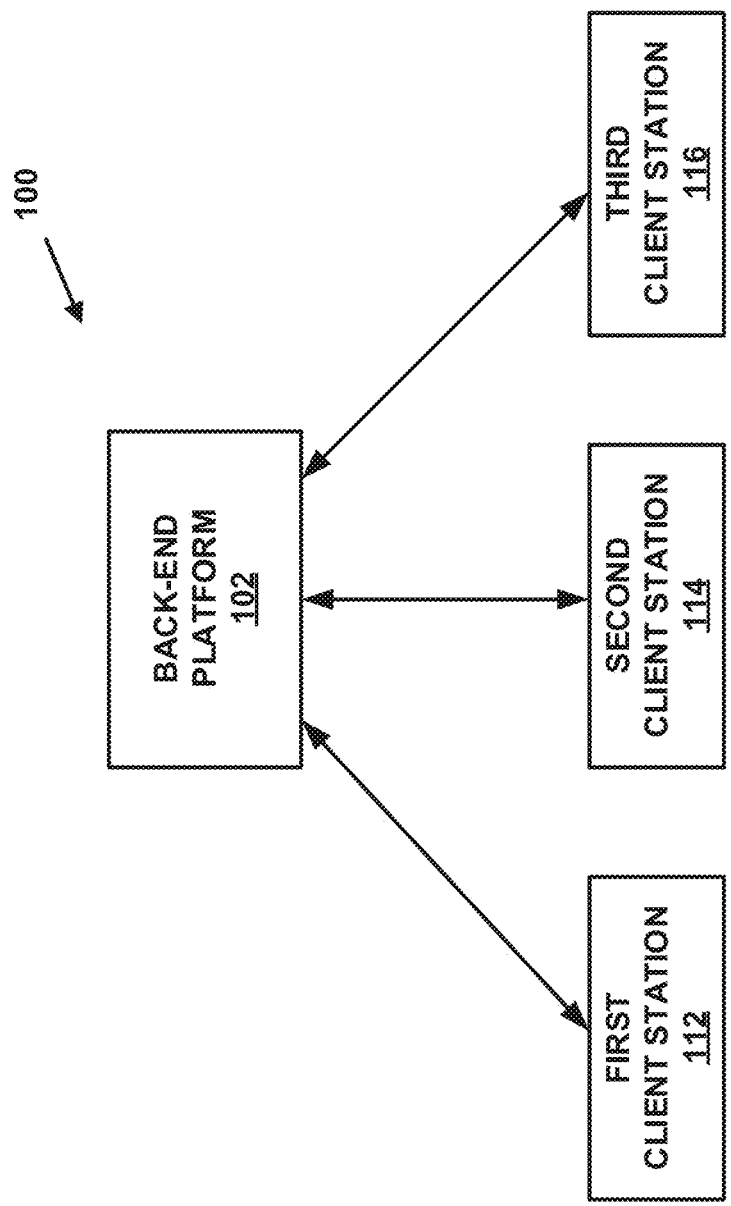
FIG. 1 depicts an example network configuration in which example embodiments may be implemented.

Turning now to the figures, FIG. 1 depicts an example network configuration 100 in which example embodiments of the present disclosure may be implemented. As shown in FIG. 1, network configuration 100 includes a back-end platform 102 that may be communicatively coupled to one or more client stations, depicted here, for the sake of discussion, as three client stations 112, 114, and 116.

In general, back-end platform 102 may comprise one or more computing systems that have been provisioned with software for carrying out one or more of the platform functions disclosed herein for driving a construction management SaaS application, including but not limited to functions related to tracking the impact of a given change event on the overall budget for a construction project. The one or more computing systems of back-end platform 102 may take various forms and be arranged in various manners.

For instance, as one possibility, back-end platform 102 may comprise computing infrastructure of a public, private, and/or hybrid cloud (e.g., computing and/or storage clusters) that has been provisioned with software for carrying out one or more of the platform functions disclosed herein. In this respect, the entity that owns and operates back-end platform 102 may either supply its own cloud infrastructure or may obtain the cloud infrastructure from a third-party provider of "on demand" computing resources, such include Amazon Web Services (AWS) or the like. As another possibility, back-end platform 102 may comprise one or more dedicated servers that have been provisioned with software for carrying out one or more of the platform functions disclosed herein. Other implementations of back-end platform 102 are possible as well.

In turn, client stations 112, 114, 116 may take any of various forms, examples of which may include a desktop computer, a laptop, a netbook, a tablet, a smartphone, and/or a personal digital assistant (PDA), among other possibilities.

As further depicted in FIG. 1, back-end platform 102 is configured to interact with one or more client stations 112, 114, 116 over respective communication paths. Each communication path between back-end platform 102 and one of client stations 112, 114, 116 may generally comprise one or more communication networks and/or communications links, which may take any of various forms. For instance, each respective communication path with back-end platform 102 may include any one or more of point-to-point links, Personal Area Networks (PANs), Local-Area Networks (LANs), Wide-Area Networks (WANs) such as the Internet or cellular networks, and/or cloud networks, among other possibilities. Further, the communication networks and/or links that make up each respective communication path with back-end platform 102 may be wireless, wired, or some combination thereof, and may carry data according to any of various different communication protocols. Although not shown, the respective communication paths with back-end platform 102 may also include one or more intermediate systems. For example, it is possible that back-end platform 102 may communicate with a given client station 112, 114, 116 via one or more intermediary systems, such as a host server (not shown). Many other configurations are also possible.

Although not shown in FIG. 1, back-end platform 102 may also be configured to receive data from one or more external data sources that may be used to facilitate functions related to the disclosed process. A given external data source—and the data output by such data sources—may take various forms.

It should be understood that network configuration 100 is one example of a network configuration in which embodiments described herein may be implemented. Numerous other arrangements are possible and contemplated herein. For instance, other network configurations may include additional components not pictured and/or more or less of the pictured components.

II. EXAMPLE PLATFORM

Figure 2:
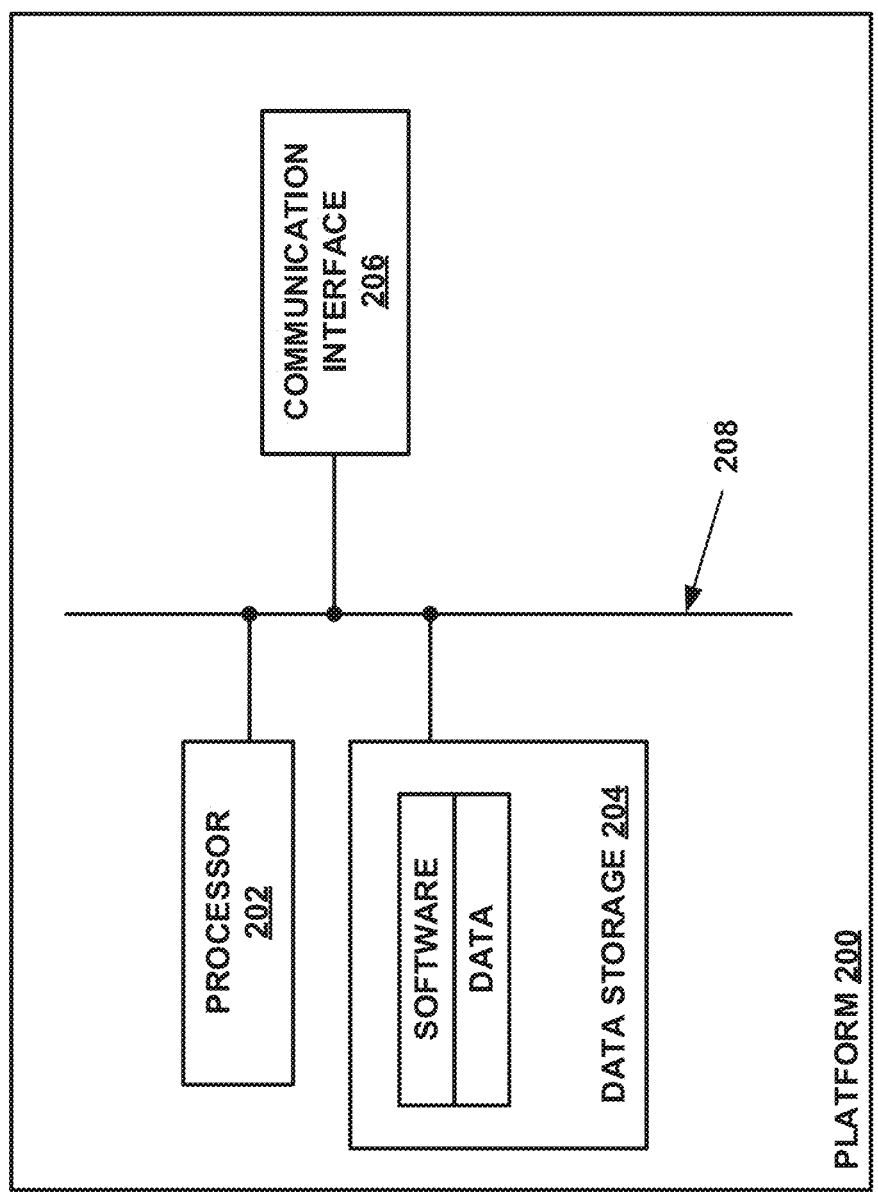
FIG. 2 depicts an example computing platform that may be configured to carry out one or more of the functions of the present disclosure.

FIG. 2 is a simplified block diagram illustrating some structural components that may be included in an example computing platform 200, which could serve as back-end platform 102 of FIG. 1. In line with the discussion above, platform 200 may generally comprise one or more computer systems (e.g., one or more servers), and these one or more computer systems may collectively include at least a processor 202, data storage 204, and a communication interface 206, all of which may be communicatively linked by a communication link 208 that may take the form of a system bus, a communication network such as a public, private, or hybrid cloud, or some other connection mechanism.

Processor 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 202 could comprise processing components that are distributed across a plurality of physical computing devices connected via a network, such as a computing cluster of a public, private, or hybrid cloud.

In turn, data storage 204 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 204 may comprise computer-readable storage mediums that are distributed across a plurality of physical computing devices connected via a network, such as a storage cluster of a public, private, or hybrid cloud.

As shown in FIG. 2, data storage 204 may be provisioned with software components that enable the platform 200 to carry out the platform-side functions disclosed herein. These software components may generally take the form of program instructions that are executable by the processor 202 to carry out the disclosed functions, which may be arranged together into software applications, virtual machines, software development kits, toolsets, or the like. Further, data storage 204 may be arranged to store data in one or more databases, file systems, or the like. Data storage 204 may take other forms and/or store data in other manners as well.

Communication interface 206 may be configured to facilitate wireless and/or wired communication with client stations (e.g., client stations 112, 114, 116 of FIG. 1) and/or external data sources, among other possibilities. Additionally, in an implementation where platform 200 comprises a plurality of physical computing devices connected via a network, communication interface 206 may be configured to facilitate wireless and/or wired communication between these physical computing devices (e.g., between computing and storage clusters in a cloud network). As such, communication interface 206 may take any suitable form for carrying out these functions, examples of which may include an Ethernet interface, a serial bus interface (e.g., Firewire, USB 3.0, etc.), a chipset and antenna adapted to facilitate wireless communication, and/or any other interface that provides for wireless and/or wired communication. Communication interface 206 may also include multiple communication interfaces of different types. Other configurations are possible as well.

Although not shown, platform 200 may additionally include one or more interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with platform 200.

It should be understood that platform 200 is one example of a computing platform that may be used with the embodiments described herein. Numerous other arrangements are possible and contemplated herein. For instance, other computing platforms may include additional components not pictured and/or more or less of the pictured components.

III. EXAMPLE OPERATIONS

As described above, the present disclosure is generally directed to an improved software application for tracking the impact of a change event on a budget for a construction project, in terms of both the cost associated with the change event and the revenue associated with the change event.

Generally speaking, a change event that is created for a construction project (or the like) may be associated with a "prime contract" entered between a client of a construction project and a contractor (e.g., a general contractor ("GC")) that generally outlines a scope of the construction project, a duration of the construction project, and an overall budget for the construction project. For instance, the prime contract may define various contractual terms for the construction project, such as the parties involved in the construction project, the scope of the construction project, and contractual dates for the construction project (e.g., start date and estimated completion date, effective date of the prime contract, etc.). The prime contract may also define financial terms, such as "markup rules" that define certain types of markup fees (e.g., insurance, overhead, etc.) the client is responsible to pay the contractor (e.g., the GC) as commission for certain work activities performed on the construction project. Examples of such markup rules are described in more detail below. A prime contract may define various other contractual terms as well.

After the client of the construction project enters into the prime contract with the contractor (e.g., GC, the construction project may commence in accordance with the contractual start date defined by the prime contract. As noted above, during the course of the project, an unplanned-for event may arise that may affect the project's schedule and/or cost.

Accordingly, a "change event" may be created to implement changes associated with an unplanned-for event on a construction project that may require additional labor, equipment, and/or materials. Examples of such an unplanned-for event may include an event involving a client's request for a design change (e.g., a request to paint the construction building in a different color), an event to resolve a design flaw, and/or an event to resolve an incident that may have caused damage to a construction object, among other possible events. A change event that may be created to implement changes associated with an unplanned-for event may take various forms.

For instance, the change event may comprise one or more "line items" that each specify a particular work activity that is to be performed in connection with the change event. Each such line item may be comprised of various types of information, examples of which may include a "cost code" (or the like) that identifies a type of work activity that is the subject of the line item (e.g., concrete work, carpentry work, electrical work, etc.), a "cost type" (or the like) that identifies a type of cost (e.g., labor, equipment, material, commitment etc.) to be incurred when performing the work activity that is the subject of the line item, a description of the work activity that is the subject of the line item, a company (or "vendor") that is to perform the work activity that is the subject of the line item, a contract with which the line item is associated, an estimated cost to complete the work activity that is the subject of the line item, and an estimated revenue that reflects how much a GC of the construction project (or the like) expects to get paid by a client of the construction project (or the like) for completing the work activity that is the subject of the given line item (which may depend in part on whether the work activity is in scope or out of scope of the prime contract for the construction project), among other possible types of information. An estimated cost of a line item may at times be referred to herein as a cost Rough Order of Magnitude ("ROM"), and an estimated revenue of a line item may at times be referred to herein as a revenue ROM.

In practice, after a change event has been created, one or more line items of the change event may progress through various different stages that may be associated with cost or revenue amount that is "more firm" (i.e., a cost or revenue amount that is more likely to end up as the final cost or revenue amount for the line item) than the estimated cost or revenue amount specified at an earlier time, such as the time the change event is created.

For instance, after a given line item is created as part of the change event, a GC may send a Request for Quote ("RFQ") to one or more potential subcontractors (e.g., an existing subcontractor on the project or possibly a new subcontractor), each potential subcontractor may submit a bid in response to the RFQ that includes a quoted cost to complete the work activity that is the subject of the given line item, and the GC may negotiate with a given potential subcontractor regarding the given potential subcontractor's quoted cost and eventually select a particular one of the received bids to pursue further (e.g., the bid having the lowest quoted cost)—which may establish an "RFQ" cost amount for the given line item that is more firm than the estimated cost specified at an earlier time (e.g., when the given line item was created).

In turn, the GC may enter into a new subcontract or amend an existing subcontract to complete the work activity that is the subject of the given line item with the subcontractor that submitted the selected bid—which may then establish a "Commitment" cost amount for the given line item that is more firm than both the estimated cost for the given line item was created and the RFQ cost for the given line item.

Thereafter, it is possible that the given line item may be included in a newly-created "change order" that describes the details for completing the work activity that is the subject of the given line item (including the revenue the GC expects to get paid by the client) to the client of the construction project (and/or an architect, engineer (or the like) employed by the client), which may establish a "Change Order" revenue for the given line item that is more firm than the estimated revenue specified at an earlier time (e.g., when the given line item was created).

The given line item of the change event may progress through various other stages as well.

Based on the foregoing, it will be appreciated that more-firm cost and revenue amounts may become available for the given line item as the given line item progresses through these different stages, which may result in an update to what is considered to be the "most-firm" cost amount or the "most-firm" revenue amount available for the given line item. For example, after an RFQ cost amount is established for the given line item as described above, this may become the most-firm cost amount for the given line item. As another example, after a Commitment cost amount is established for the given line item as described above, this may become the most-firm cost amount for the given line item. As yet another example, after a Change Order revenue amount is established for the given line item as described above, this may become the most-firm revenue amount for the given line item. Other examples are possible as well.

However, as previously described, existing approaches for establishing and tracking the cost and revenue amounts for a change event's one or more line items may have many limitations. Accordingly, as noted, the present disclosure is directed to a software application for tracking the impact of a change event on a budget for a construction project, in terms of both the cost associated with the change event and the revenue associated with the change event. This disclosed software application—which may comprise a tool referred to herein as a "Change Events tool"—may include various aspects and take various forms.

In one aspect, as noted above, the disclosed software application may provide improved techniques for setting and tracking an estimated revenue for one or more line items of a change event. For instance, as an initial matter, the disclosed software application may enable an estimated revenue for a given line item of a change event to be set to either (i) a static amount or (ii) a dynamic amount that tracks a most-firm cost that is available for the given line item, such that the estimated revenue amount for the given line item is updated to mirror the most-firm cost amount, which may change at various stages described above. The disclosed software application may enable the estimated revenue for the given line item included as part of the change event to be set in various manners.

As one possibility, the disclosed software application may enable the estimated revenue for the given line item to be set by providing an "estimated revenue" field associated with the given line item that can either be set to a static amount (which could be $0 if the change event is "in scope" of a prime contract or some other amount if the change event is "out of scope" of a prime contract) or can be set to a dynamic amount that tracks the most-firm cost amount available for the given line item.

As another possibility, the disclosed software application may enable the estimated revenue for the given line item to be set by providing an option to designate the change event that includes the given line item as either "out of scope," "in scope," or "TBD," where each such designation may have a corresponding type of estimated revenue amount that may be used as the estimated revenue amount for the given line item. The type of estimated revenue amount for each scope designation may take various forms.

For example, if the change event that includes the given line item is designated as "out of scope," the disclosed software application may cause the estimated revenue for the given line item to be set to a dynamic amount that tracks the most-firm cost that is available for the given line item (although it is also possible that a user may request to change the estimated revenue for the given line item to be set to a predefined static amount associated with out-of-scope change events as opposed to such a dynamic amount). As another example, if the change event that includes the given line item is designated as "in scope," the disclosed software application may cause the estimated revenue for the given line item to be set to a predefined static amount associated with in-scope change events, such as an estimated revenue amount $0—which may indicate that the GC is not expected to be paid for the given line item because it is already covered under the prime contract. As another example, if the change event that includes given line item is designated as "TBD," the disclosed software application may cause the estimated revenue for the given line item to be set to a predefined static amount associated with change events that have not yet been designated as in scope or out of scope, which may take any of various forms. Other examples are possible as well. Further, the disclosed software application may enable the estimated revenue for the given line item to be re-set at a later time by changing the scope designation of the change event that includes the given line item (e.g., by changing from "TBD" to either "in scope" or "out of scope").

As yet another possibility, the disclosed software application may enable the estimated revenue for the given line item to be set by providing an option to designate the given line item itself (as opposed to the change event) as either "out of scope," "in scope," or "TBD," where each such designation may have a corresponding type of estimated revenue amount that may be used as the estimated revenue amount for the given line item. In this respect, the type of estimated revenue amount for each scope designation may take any of the forms described above.

The disclosed software application may enable the estimated revenue for the given line item included as part of the change event to be set in other manners as well.

In another aspect, the disclosed software application may function to determine markup amounts associated with a change event and present such markup amounts to a user. Generally speaking, a change event may be associated with estimated markup amounts that are established at the time the change event is created (or some time after the change event is created). Each estimated markup amount may represent a respective type of markup fee that represents a type of commission (e.g., insurance, overhead, profits, sales tax, etc.) that the GC expects from the client of the construction project (or the like) in connection with the change event. In line with the discussion above, more-firm markup amounts may become available as a given line item of the change event progresses through different stages, such as markup amounts that become available when the given line item of the change event is included in a change order, which may eventually result in an update to the most-firm markup amounts for the change event. In this respect, a respective markup amount for each type of markup fee may be associated with a respective markup variable, such as an estimated revenue markup variable that may be associated with the respective estimated markup amount for each type of markup fee, a change order revenue markup variable that may be associated with the respective markup amount for each type of markup fee that becomes available when a given line item of a change event is included in a change order, and a most-firm revenue markup variable that may be associated with the respective most-firm markup amount for each type of markup fee. Each of these markup variables are described in more detail below.

In yet another aspect, the disclosed software application may function to provide an up-to-date estimate of the overall budget for a construction project. For instance, for each change event created for the construction project, the most-firm cost amount and/or the most firm revenue amount for each line item of the change event may serve as input to a "Budgeting" tool of the disclosed software application, which may be used to provide an up-to-date estimate of the overall budget for the construction project. In line with the discussion above, the overall budget for the construction project may be updated dynamically as a most-firm cost amount and/or a most-firm revenue amount for a given line item of a given change event becomes available.

Figure 3:
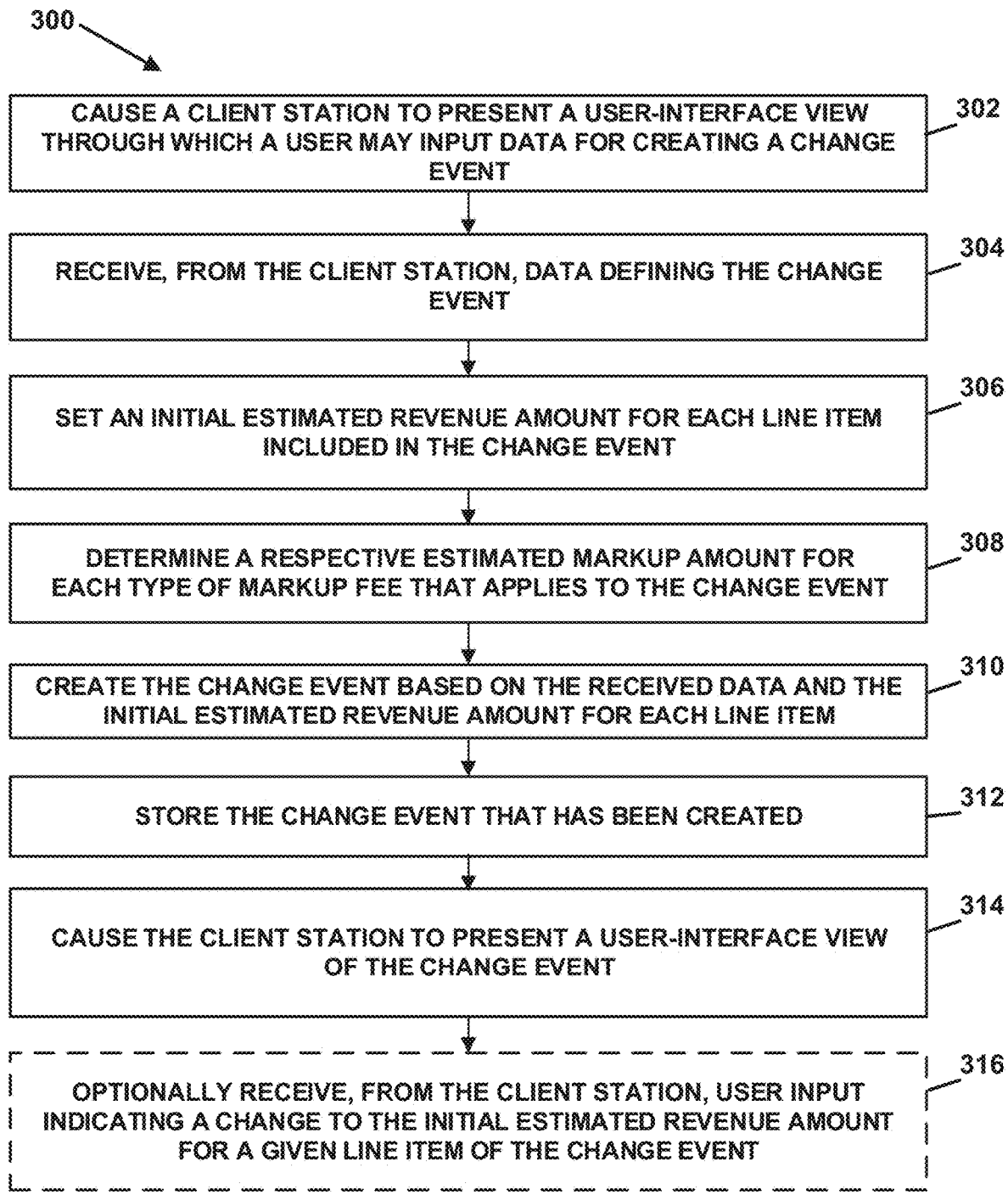
FIG. 3 depicts an example flow chart for creating a change event.

In accordance with the present disclosure, one example process for creating a change event will now be described with reference to FIG. 3. For the purposes of illustration only, the example functions involved in the example process are described as being carried out by a back-end platform (e.g., back-end platform 102). However, it is possible that the responsibility for carrying out the functions of the disclosed process could be distributed between a back-end platform (e.g., back-end platform 102) and one or more client stations (e.g., client stations 112, 114, and/or 116). Further, it should be understood that the flow diagram in FIG. 3 is merely described in such manner for the sake of clarity and explanation and that some functions may be carried out in various other manners as well, including the possibility that example functions may be added, removed, rearranged into different orders, grouped together, and/or not grouped together at all.

According to an example implementation, the process for creating the change event may begin with a user (e.g., an employee of the GC) requesting access to a user-interface view of the Change Events tool that may facilitate the creation of the change event. For instance, the user may launch a native application on the user's client station (e.g., client station 112) or direct a web browser on the user's client station to a uniform resource locator ("URL") for the disclosed software application, either of which may cause the user's client station to send a request to back-end platform 102 to access the user-interface view.

At block 302, back-end platform 102 may cause the user's client station to present a user-interface view through with the user may input data for creating the change event. The user-interface view may comprise various types of data fields that the user may interact with to specify information about the change event being created.

For instance, as one possibility, the user-interface view may include various types of data fields that the user may interact with to specify information identifying the change event, one example of which may take the form of a "change event number" field that may be used to specify an identification number for the change event, among other examples.

As another possibility, the user-interface view for creating the change event may include various types of data fields that the user may interact with to specify information describing what the change event is about, examples of which may take the form of a "title" field that may be used to specify a descriptive title for the change event, a "type" field that may be used to specify the type of change event being created (e.g., a client change, a design flaw, an incident resulting in material damage, etc.), a "change reason" field that may be used to specify a reason for creating the change event (e.g., design development, owner request, problem with an existing condition, etc.), a "description" field that may be used to describe how the change event may impact the project's schedule, cost, and/or revenue, and/or an "attachment" field that may be used to attach any relevant files (e.g., drawings) to the change event, among other examples.

As still another possibility, the user-interface view may include a set of data fields that the user may interact with to define one or more line items that are included as part of the change event. For example, for each line item, the set of data fields for defining the line item may comprise a "cost code" field and a "cost type" field that the user may interact with to indicate the cost code and cost type for the line item, a "description" field that may be used to specify a textual description of the line item, a "vendor" field that may indicate a vendor (e.g., subcontractor) associated with the line item, and/or a "contract" field that may indicate a purchase order or subcontract number associated with the line item. As another example, for each line item, the set of data fields for defining the line item may comprise an "estimated cost" field that the user may interact with to specify a respective estimated cost amount, and/or an "estimated revenue" field that the user may interact with to specify whether the estimated revenue for the line item is to be set to a static amount or a dynamic amount that tracks the most-firm cost for the line item.

As yet another possibility, the user-interface view may include a "scope" field that the user may interact with to indicate whether a given line item of the change event or the change event as a whole is "out of scope," "in scope," or "TBD" (if the user is unsure of the scope. In line with the discussion above, the designation in this "scope" field may then be used to set the respective estimated revenue for each line item of the change event. For instance, as noted above, a designation of "in scope" may lead to the estimated revenue of a given line item being set to a static amount of $0, a designation of "out of scope" may lead to the estimated revenue of a given line item being set to a dynamic amount that tracks a most-firm cost of the given line item, and a designation of "TBD" may lead to the estimated revenue of the given line item being set to a static amount of $0, among other possibilities.

As yet another example, the user-interface view may include a "markup" field that the user may interact with to specify which prime contract's markup rules should be used when determining markup amounts for the work activities that are the subject of the change event's line items. For example, as described above, a prime contract may include markup rules that define certain types of markup fees (e.g., insurance, overhead, etc.) the client is responsible to pay the GC as commission for certain work activities performed on the construction project. In some instances, by default, the markup field may be set to the most-recently-created prime contract, such that the most-recently-created prime contract's markup rules are applied to the change event.

The user interface for creating the change event may comprise various other types of data fields as well, such as a "status" field that may be used to specify the status of the change event (e.g., open, closed, pending approval, or void, etc.), among other types of data fields.

Figure 4:
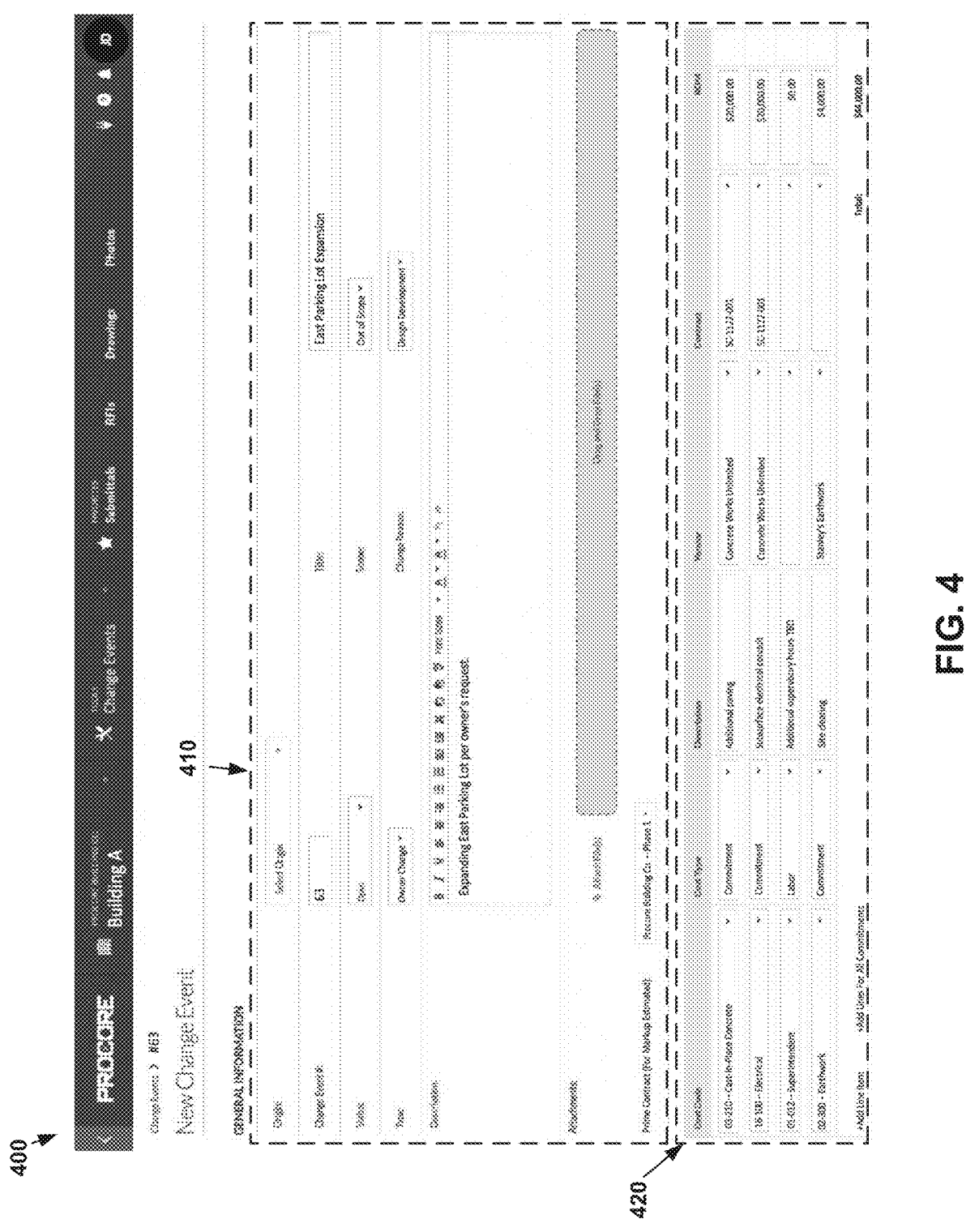

To illustrate, FIG. 4 depicts one possible example of a user-interface view 400 of the Change Events tool that may be provided to a user via the user's client station. View 400 may include various elements in region 410 and region 420.

As shown in FIG. 4, region 410 may include various types of data fields described above that a user may interact with to specify information about the change event being created, including information identifying the change event, information describing what the change event is about, the scope of the change event, the status of the change event, and which prime contract's markup rules should be used for the change event.

For instance, as shown in FIG. 4, region 410 may include information identifying the change event, such as a "Change Event #" field that is set to "63." Region 410 may also include information describing what the change event is about, such as (1) a "Title" field that is set to "East Parking Lot Expansion," (2) a "Type" field that is set to "Owner Change," (3) a "Change Reason" field that is set to "Design Development," (4) a "Description" field that is set to "Expanding East Parking Lot per owner's request," and (5) an "Attachments" field that does not presently include any attachments. Further, region 410 may include a "Status" field that is set to "Open," a "Scope" field that is set to "Out of Scope," and a "Prime Contract (For Markup Estimates)" field (which represents the markup field described above) that is set to a prime contract named "Procore Building Co.—Phase 1—." Collectively, the values for the foregoing types of data fields may indicate that the change event identified as change event number "63" and entitled "East Parking Lot Expansion," is "open" to expand the "East Parking Lot" as a "design development" requested by the client (which is "out of scope" of the prime contract), and the change event should follow the markup rules of the prime contract associated with "Procore Building Co.—Phase 1—."

One of ordinary skill in the art will appreciate that region 410 may include more or less types of data fields that include information identifying the change event and/or information describing what the change event is about. One of ordinary skill in the art will also appreciate that the types of data fields included in region 410 may take various other forms and can be arranged in various different manners.

In turn, region 420 may include various types of data fields that the user may interact with to define one or more line items that are included as part of the change event, including a "Cost Code" field, a "Cost Type" field, a "Description" field, a "Vendor" field, a "Contract" field, and a "Cost ROM" field which represents the estimated cost field described above). For example, FIG. 4 shows that four line items have been defined in region 420 for the "East Parking Lot Expansion" change event: (1) a first line item that comprises a "Cost Code" field that is set to "Concrete," a "Cost Type" field that is set to "Commitment," a "Description" field that is set to "Additional paving," a "Vendor" field that is set to "Concrete Works Unlimited," a "Contract" field that is set to "SC-1122-001," and a "ROM" field that is set to "$20,000," (2) a second line item that comprises a "Cost Code" field that is set to "Electrical," a "Cost Type" field that is set to "Commitment," a "Description" field that is set to "Subsurface electrical conduit," a "Vendor" field that is set to "Concrete Works Unlimited," a "Contract" field that is set to "SC-1122-001," and a "ROM" field that is set to "$20,000," (3) a third line item that comprises a "Cost Code" field that is set to "Superintendent," a "Cost Type" field that is set to "Labor," a "Description" field that is set to "Additional supervisory hours TBD," a "Vendor" field and "Contract" field that are both presently not set to any value (either of which may indicate that no subcontractor may be involved for the type of work associated with the line item), and a "ROM" field that is set to "$0," and (4) a fourth line item that comprises a "Cost Code" field that is set to "Earthwork," a "Cost Type" field that is set to "Commitment," a "Description" field that is set to "Site cleaning," a "Vendor" field that is set to "Stanley's Earthwork," a "Contract" field that is presently not set to any value, and a "ROM" field that is set to "$4,000."

One of ordinary skill in the art will appreciate that region 420 may include more or less types of data fields to define a given line item and that the data fields that define a given line item may take various other forms and can be arranged in various different manners. One of ordinary skill in the art will also appreciate that region 420 may include elements other than data fields, such as an "Add Line Item" control element shown in region 420 that the user may interact with to add additional line items to the change event.

Further, one of ordinary skill in the art will appreciate that view 400 may include various other elements that may be inside or outside of region 410 and region 420. As one example, view 400 may include a control button (not shown) to save the change event. As another example, as shown in FIG. 4, view 400 may include a menu bar that is displayed horizontally across the top of view 400. The menu bar may include one or more pull-down menus that may be used to request access to various other tools available on the disclosed software application (e.g., an "RFQ" tool, a "Change Order" tool, a "Budgeting" tool, etc.), and/or one or more individual icons, such as an account icon that may be selected to view the user's account settings and/or credentials for the disclosed software application.

It should be understood that the menu bar may take various other forms as well. It should also be understood that FIG. 4 illustrates one example of a user-interface view of the Change Events tool that facilitates the creation of the change event and that such a user-interface view may take various other forms as well.

At block 304, back-end platform 102 may then receive, from the user's client station (e.g., client station 112), data defining the change event. Back-end platform 102 may receive such data at various times.

For example, after the user has accessed the user-interface view of the "Change Event" tool (e.g., view 400 of FIG. 4) and inputted the relevant information that defines the change event, the user may then input a request to create the change event (e.g., by selecting the control button to save the change event), which may cause the user's client station to transmit the data defining the change event to back-end platform 102. As another example, each time the user inputs a new data value into a data field of the user-interface view, the user's client station may transmit that particular data value to back-end platform 102, in which case back-end platform 102 may receive the data defining the change event on a field-by-field basis. One of ordinary skill in the art will appreciate that the user's client station and back-end platform 102 may communicate at various other times as well.

At block 306, after receiving the data defining the change event, back-end platform 102 may set an initial estimated revenue amount for each line item included in the change event. The initial estimated revenue amount that is set for each line item of the change event may take various forms.

For instance, as one possibility, back-end platform 102 may set the estimated revenue amount for a given line item of the change event to a static amount, such as $0. As another possibility, back-end platform 102 may set the estimated revenue amount for a given line item of the change event to a dynamic amount that tracks the most-firm cost amount for the given line item. For example, at this stage of the disclosed process, the estimated revenue amount for the given line item may be initially set to the estimated cost amount for the given line item but may change as the given line item's most-firm cost amount changes at subsequent stages where a cost amount that is more firm than the given line item's estimated cost amount becomes available.

The initial estimated revenue amount that is set for each line item of the change event may take various other forms as well.

Further, back-end platform 102 may determine whether to set the initial estimated revenue amount for each line item of the change event to a static amount or a dynamic amount in various manners. For instance, as one possibility, back-end platform 102 may determine whether to set the initial estimated revenue amount for each line item of the change event to a static amount or a dynamic amount based on a "scope" designation that is included as part of the received data defining the change event, where back-end platform 102 functions to set each line item of the change event to a static amount if the change event has an "in scope" or "TBD" designation and to set each line item of the change event to a dynamic amount if the given change event has an "out of scope" designation. As another possibility, if the data defining the change event includes data that specifies whether the initial estimated revenue amount for one or more line items of the change event are to be set to a static amount or a dynamic amount, back-end platform 102 may determine whether to set the initial estimated revenue amount for these one or more line items to a static amount or a dynamic amount based on this data. As yet another possibility, back-end platform 102 may determine that the initial estimated revenue amount for each line item of the change event is to be set to a "default" amount (e.g., a static amount of $0 or a dynamic amount that tracks the most-firm cost amount) that can later be updated based on user input. Back-end platform 102 may determine the initial estimated revenue amount for each line item of the change event in other various manners as well.

At block 308, back-end platform 102 may determine a respective estimated markup amount for each type of markup fee (e.g., insurance, overhead, etc.) that applies to the change event. Back-end platform 102 may determine the respective estimated markup amount for each type of markup fee in various manners, which may depend on the markup rules that are applied to line items of the change event.

As one possibility, back-end platform 102 may determine the estimated markup amount for the respective type of markup fee (e.g., insurance) by (1) identifying one or more markup rules that are specific to the respective type of markup fee, and then (2) applying the one or more markup rules to the respective estimated revenue for each line item of the change event that meets the markup rule's criteria (e.g., each line item having a given cost type) in order to derive the estimated markup amount for the respective type of markup fee. For example, back-end platform 102 may identify a markup rule that are specific to the respective type of markup fee (e.g., insurance), where the markup rule may comprise a given markup percentage (e.g., 1%) that is applied to the respective estimated revenue for each line item that includes a given cost type (e.g., labor or commitment cost type) to generate an estimated markup amount for each line item that includes the given cost type. Back-end platform 102 may then aggregate the estimated markup amounts of such line items to derive the respective markup amount for the estimated markup variable associated with the respective type of markup fee.

Generally speaking, the respective estimated markup amount for each type of markup fee represents the most-firm markup amount for each type of markup fee at this stage of the process. However, in line with the discussion above, the most-firm markup amount for each type of markup fee may be updated at subsequent stages.

Back-end platform 102 may determine the respective estimated markup amount for each type of markup fee that applies to the change event in various other manners as well.

At block 310, back-end platform 102 may create the change event based on the received data defining the change event and the initial estimated revenue amount that is determined for each line item of the change event, which may involve creating a data record that represents the change event. The data record that represents the change event may take various forms.

As one possibility, for each line item included in the change event, the data record may include (or may be associated with) one or more cost fields, including an "estimated cost" field, an "RFQ cost" field, a "commitment cost" field, a "non-commitment cost" field, and/or a "most-firm cost" field. In line with the discussion above, the "estimated cost" field for a given line item may represent the estimated cost to complete work associated with the given line item, the "RFQ cost" field for a given line item may represent a quoted cost to complete the work activity that is the subject of the given line item, the "commitment cost" field for a given line item may represent a contractual cost in which the GC agreed to pay the subcontractor in exchange for the subcontractor completing the work activity that is the subject of the given line item, the "non-commitment cost" field for a given line item may represent costs not associated with a commitment (e.g., a GC employee's labor) for completing the work activity that is the subject of the given line item, and the "most-firm cost" field may represent the most-firm cost that is currently available for the given line item. In practice, only the estimated cost field and the most-firm cost field may be populated at the time the data record is created, and other cost fields may be populated (and the most-firm cost field may be updated) as line items of the change event progress through different stages described above. However, it should be understood that the estimated cost field and the most-firm cost field may be populated at various other times as well.

As another possibility, for each line item included in the change event, the data record may include (or may be associated with) one or more revenue fields, including an "estimated revenue" field, a "change order revenue" field, and/or a "most-firm revenue" field. The "estimated revenue" field for a given line item may represent an estimated revenue the GC expects for completing the work activity that is the subject of the given line item, which could be set to either a static amount such as $0 or a dynamic amount that tracks the most-firm cost for the given line item. The "change order" revenue field for a given line item may represent the revenue for the given line item that is established by a change order that is created for the given line item. As noted above, the "change order" revenue field for the given line item may be set to a Change Order revenue amount that is established for the given line item, which may become the most-firm revenue amount for the given line item. Further, in line with the discussion above, the "most-firm revenue" field for a given line item may represent the most-firm revenue that is currently available for the given line item. In practice, only the estimated revenue field and the most-firm revenue field may be populated at the time the data record is created, and other revenue fields may be populated (and the estimated revenue field and/or the most-firm revenue field may be updated) as line items of the change event progress through different stages described above.

As yet another possibility, the data record may include (or may be associated with) one or more markup variables associated with each type of markup fee included as part of the data record. For instance, for a given type of markup fee (e.g., insurance), the data record may include an "estimated markup" variable, a "change order markup" variable, and/or a "most-firm markup" variable. Generally speaking, the "estimated markup" variable associated with a given type of markup fee may represent a markup associated with the given type of markup fee that is applied to the estimated revenues of certain line items of the change event (which are identified using the markup rules). Similarly, the "change order markup" variable for a given type of markup fee may represent a markup associated with the given type of markup fee that is applied to the change order revenues of certain line items of the change event (which are identified using the markup rules). The "most-firm markup" variable for a given type of markup fee may represent the most-firm markup associated with the given type of markup fee, which may be comprised of estimated markup amounts for certain line items and/or change order markup amounts for certain line items (among other possibilities). Each of these markup variables may take various forms as described with reference to FIG. 3.

As still another possibility, the data record may include (or may be associated with) the various types of data fields that specify information about the change event as described above with reference to block 302. The data record that represents the change event may take various other forms as well.

At block 312, back-end platform 102 may then store the change event that has been created, which may involve storing the data record that represents the change event in a given data store (e.g., data storage 204, or some other physical datastore located outside of back-end platform 102). One of ordinary skill in the art will appreciate that back-end platform 102 may store the change event in various other manners as well.

In turn, at block 314, back-end platform 102 may cause the user's client station (e.g., client station 112) to present a user-interface view of the change event. The user-interface view may include (1) one or more cost fields (e.g., an estimated cost field, an RFQ cost field, a commitment cost field, a non-commitment cost field, and/or a most-firm cost field) for each line item, (2) one or more revenue fields (e.g., an estimated revenue field, a change order revenue field, and/or a most-firm revenue field) for each line item, and/or (3) one or more markup variables associated with each type of markup fee.

As one example to illustrate, FIG. 5A depicts an example user-interface view 500 of the change event that was created and described above with reference to FIG. 4. As shown, user-interface view 500 includes various elements, such as the data fields shown in region 510, which may take various forms.

As one possibility, region 510 may include a set of data fields that define each line item included as part of the change event, including a "Cost Code" field, a "Cost Type"

field, a "Description" field, a "Vendor" field, and a "Contract" field. For example, as shown in FIG. 5A, region 510 includes the set of data fields that define each of the four line items described above with reference to region 420 of FIG. 4.

As another possibility, region 510 may include one or more cost fields for each line item included as part of the change event, including a "Cost ROM" field (which represents the estimated cost field), an "RFQ cost" field, a "Commitment cost" field, a "Non-Commitment cost" field, and a "Latest Cost" field (which represents the most-firm cost field described above). For example, with respect to the first line item shown in FIG. 5A that is directed to "Additional Paving," region 510 shows that (1) the "Cost ROM" field is set to "$20,000.00," (2) the "RFQ cost" field, "Commitment cost" field, and the "Non-Commitment cost" field presently have not been set to any amount, and (3) the "Latest Cost" field is set to "$20,000.00," which in this case is the most-firm cost amount available for the first line item given that the "RFQ cost" field, "Commitment cost" field, and the "Non-Commitment cost" field have not been set to any amount.

As another example, with respect to the second line item that is directed to "Subsurface electrical conduit," region 510 shows that (1) the "Cost ROM" field is set to "$20,000.00," (2) the "RFQ cost" field, "Commitment cost" field, and the "Non-Commitment cost" field presently have not been set to any amount, and (3) the "Latest Cost" field is set to "$20,000.00," which in this case is the most-firm cost amount available for the second line item given that the "RFQ cost" field, "Commitment cost" field, and the "Non-Commitment cost" field have not been set to any amount.

As yet another example, with respect to the third line item that is directed to "Additional supervisory hours TBD," region 510 shows that (1) the "Cost ROM" field is set to "$0.00," (2) the "RFQ cost" field, "Commitment cost" field, and the "Non-Commitment cost" field presently have not been set to any amount, and (3) the "Latest Cost" field is set to "$0.00," which in this case is the most-firm cost amount available for the third line item given that the "RFQ cost" field, "Commitment cost" field, and the "Non-Commitment cost" field have not been set to any amount.

As a further example, with respect to the fourth line item that is directed to "Site cleaning," region 510 shows that (1) the "Cost ROM" field is set to "$4,000.00," (2) the "RFQ cost" field, "Commitment cost" field, and the "Non-Commitment cost" field presently have not been set to any amount, and (3) the "Latest Cost" field is set to "$4,000.00," which in this case is the most-firm cost amount available for the fourth line item given that the "RFQ cost" field, "Commitment cost" field, and the "Non-Commitment cost" field have not been set to any amount.

As yet another possibility, region 510 may include one or more revenue fields for each line item included as part of the change event, including a "Revenue ROM" field that represents the estimated revenue field described above, a "Prime PCO revenue" field that represents the change order revenue field described above, and a "Latest Price" field that represents the most-firm revenue field described above. In line with the discussion above, given that the "Scope" field in region 410 of FIG. 4 was set to "Out of Scope," the "Revenue ROM" field of each line item in region 510 may be set to a dynamic amount that tracks the most-firm cost amount for the given line item. This is indicated by the lightning bolt indicator to the left of the respective estimated revenue amount for each line item in region 510.

Accordingly, in one example, with respect to the first line item, region 510 shows that (1) the "Revenue ROM" field is set to "$20,000.00," which reflects the fact that the "Revenue ROM" field has been set to a dynamic amount that tracks the most-firm cost amount for the first line item (which in this case is the estimated cost amount), (2) the "Prime PCO revenue" field presently has not been set to any amount because the first line item has not been included in any change orders, and (3) the "Latest Price" field is set to "$20,000.00," which in this case is the most-firm revenue amount available for the first line item given that the "Prime PCO revenue" field has not been set to any amount.

As another example, with respect to the second line item, region 510 shows that (1) the "Revenue ROM" field is set to "$20,000.00," which reflects the fact that the "Revenue ROM" field has been set to a dynamic amount that tracks the most-firm cost amount for the second line item (which in this case is the estimated cost amount), (2) the "Prime PCO revenue" field presently has not been set to any amount because the second line item has not been included in any change orders, and (3) the "Latest Price" field is set to "$20,000.00," which in this case is the most-firm revenue amount available for the second line item given that the "Prime PCO revenue" field has not been set to any amount.

As yet another example, with respect to the third line item, region 510 shows that (1) the "Revenue ROM" field is set to "$0.00," which reflects the fact that the "Revenue ROM" field has been set to a dynamic amount that tracks the most-firm cost amount for the third line item (which in this case is the estimated cost amount), (2) the "Prime PCO revenue" field presently has not been set to any amount because the third line item has not been included in any change orders, and (3) the "Latest Price" field is set to "$0.00," which in this case is the most-firm revenue amount available for the third line item given that the "Prime PCO revenue" field has not been set to any amount.

As a further example, with respect to the fourth line item, region 510 shows that (1) the "Revenue ROM" field is set to "$4,000.00," which reflects the fact that the "Revenue ROM" field has been set to a dynamic amount that tracks the most-firm cost amount for the fourth line item (which in this case is the estimated cost amount), (2) the "Prime PCO revenue" field presently has not been set to any amount because the fourth line item has not been included in any change orders, and (3) the "Latest Price" field is set to "$4,000.00," which in this case is the most-firm revenue amount available for the fourth line item given that the "Prime PCO revenue" field has not been set to any amount.

As still another possibility, region 510 may include one or more markup variables for each type of markup fee included in region 510. For instance, the types of markup fees labeled as "Insurance" and "Profit" in region 510 may each include a "ROM" markup variable that represents the estimated markup variable described above, a "Prime PCO" markup variable that represents the change order markup variable described above, and a "Latest Price" markup variable that represents the most-firm markup variable described above. For each type of markup fee, these markup variables may be set to respective markup amounts that may be determined in various manners described above with reference to block 312.

In particular, for each type of markup fee, the "ROM" markup variable may be set to a respective markup amount.

For example, with respect to the type of markup fee labeled as "Insurance," FIG. 5A shows that the "ROM" markup variable is set to a markup amount of "$440.00." In line with the discussion above, back-end platform 102 may determine this markup amount by identifying the markup rules that are specific to the type of markup fee labeled as "Insurance," where such markup rules may comprise a given markup percentage (e.g., 1%) that is applied to the respective estimated revenue for each line item that includes a labor or commitment cost type to generate a respective estimated markup amount for each line item that includes the given cost type. Specifically, given that all four line items in region 510 includes either a labor or commitment cost type, the given markup percentage (e.g., 1%) may be applied to the respective estimated revenue for each line item in region 510 to generate a respective estimated markup amount for each line item. Back-end platform 102 may then aggregate the respective estimated markup amounts of the four line items to derive the markup amount of "$440.00" for the "ROM" markup variable associated with the type of markup fee labeled as "Insurance" (e.g., $20,000.00*0.01+ $20,000.00*0.01+$0.00*0.01+$4,000.00*0.01).

As another example, with respect to the type of markup fee labeled as "Profit," FIG. 5A shows that the "ROM" markup variable is set to a markup amount of "$1,320.00." In line with the discussion above, back-end platform 102 may determine this markup amount by identifying the markup rules that are specific to the type of markup fee labeled as "Profit," where such markup rules may comprise a given markup percentage (e.g., 3%) that is applied to the respective estimated revenue for each line item that includes either a labor or commitment cost type to generate a respective estimated markup amount for each line item that includes either the labor or commitment cost type. Specifically, given that all four line items in region 510 include either the labor or commitment cost type, the given markup percentage (e.g., 3%) may be applied to the respective estimated revenue for each line item in region 510 to generate a respective estimated markup amount for each line item. Back-end platform 102 may then aggregate the respective estimated markup amounts of the four line items to derive the markup amount of "$1,320.00" for the "ROM" markup variable associated with the type of markup fee labeled as "Profit" (e.g., $20,000.00*0.03+$20,000.00*0.03+$0.00*0.03+$4,000.00*0.03).

For each type of markup fee, region 510 may also include the "Prime PCO" markup variable that may be set to a respective markup amount. For example, with respect to the type of markup fee labeled as "Insurance," FIG. 5A shows that the "Prime PCO" markup variable is set to a markup amount of "$0.00," because the respective change order revenue for each line item is presently not set to any amount (which may indicate that none of the line items in region 510 are presently included in any change order). Likewise, as another example, with respect to the type of markup fee labeled as "Profit," FIG. 5A shows that the "Prime PCO" markup variable is set to a markup amount of "$0.00" because the respective change order revenue for each line item is presently not set to any amount (which may indicate that none of the line items in region 510 are presently included in any change order).

Further, for each type of markup fee, region 510 may also include the "Latest Price" markup variable that may be set to a respective markup amount. For example, with respect to the type of markup fee labeled as "Insurance," FIG. 5A shows that the "Latest Price" markup variable is set to a markup amount of "$440.00." In line with the discussion above, back-end platform 102 may determine this markup amount by (1) identifying the most-firm markup amount for each individual line item (which in this case is the respective estimated markup amount for each line item in region 510), and (2) aggregating the most-firm markup amounts of the line items to derive the markup amount of "$440.00" for the "Last Price" markup variable associated with the type of markup fee labeled as "Insurance" (e.g., $20,000.00*0.01+ $20,000.00*0.01+$0.00*0.01+$4,000.00*0.01). The markup amount of "$1,320.00" for the "Last Price" markup variable associated with the type of markup fee labeled as "Profit" may be determined in a similar fashion.

Region 510 may include various other data fields and may take various other forms as well. For instance, as further shown in FIG. 5A, region 510 may include an "Over/Under" field for each line item included in the change event. For each line item included in the change event, the "Over/Under" field may be set to an amount determined by calculating the difference between the most-firm revenue amount for the line item and the most-firm cost amount for the line item.

The user-interface view (e.g., user-interface view 500) of the change event may take various other forms as well.

In some implementations, after the initial estimated revenue amount has been set for a line item of the change event, the disclosed software application may also enable a user to edit the initial estimated revenue amount for the line item. For instance, as one possibility, the disclosed software application may enable a user to edit the initial estimated revenue amount for a line item of the change event via a user-interface view that presents a visualization of the change event, one example of which may take the form of user-interface view 500. In this respect, the disclosed software application may enable a user to interact with user-interface view 500 to edit the initial estimated revenue amount of a line item in various manners. For instance, with reference to the fourth line item in region 510, the disclosed software application may enable the user to input an indication to edit the initial estimated revenue amount for the fourth line item that was initially set to a dynamic amount that tracks the estimated cost amount of "$4,000" to a static amount (e.g., $0 or some value greater than $0).

Figure 5B:
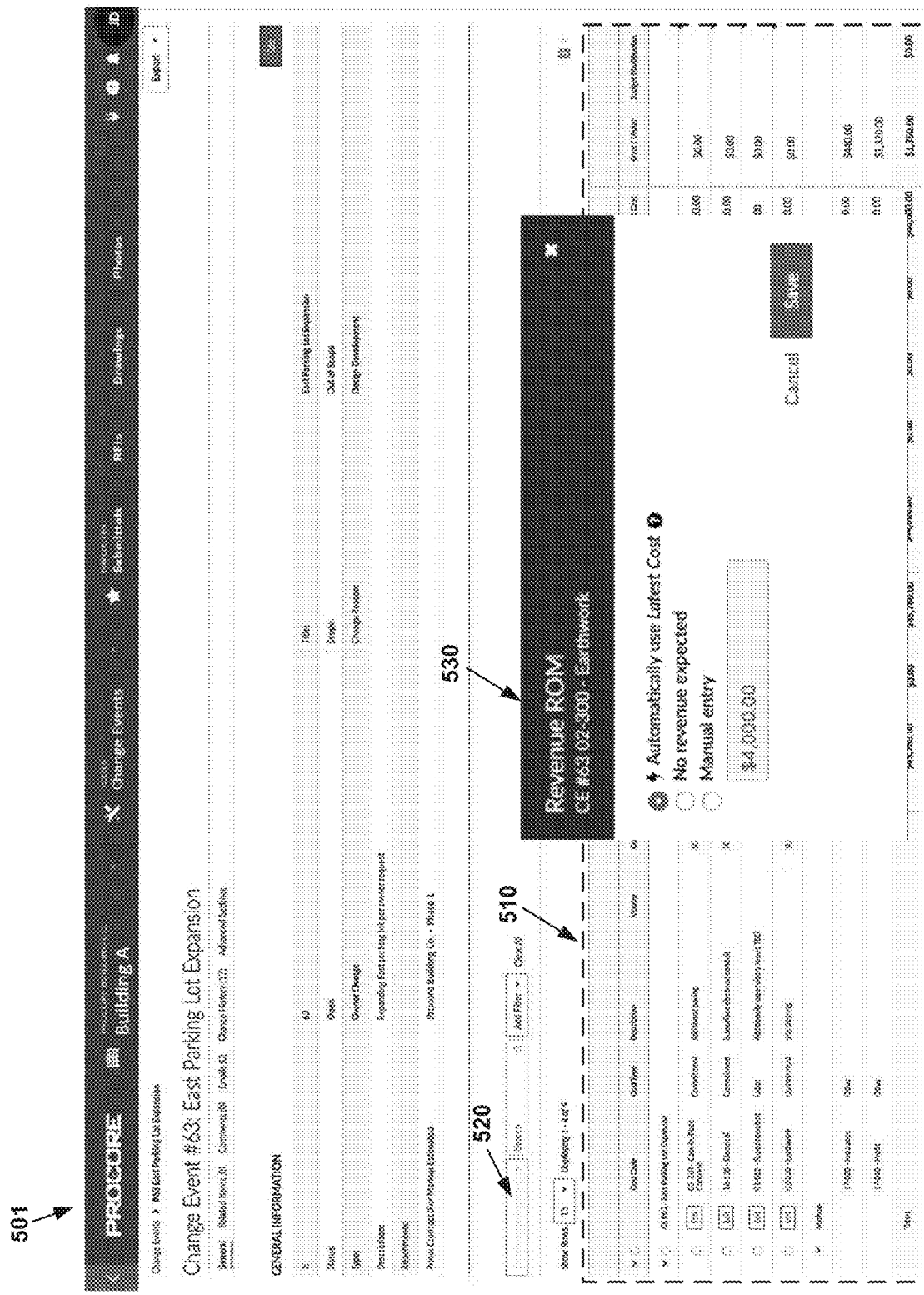
FIG. 5B depicts another example user-interface view of a change event that may be presented to a client station.

In practice, the disclosed software application may enable a user to interact with user-interface view 500 to edit the initial estimated revenue amount of a line item by selecting a cell within region 510 that corresponds to the estimated revenue amount for the line item and then selecting an option to edit the estimated revenue amount to a static value or to a dynamic value. For instance, as shown in FIG. 5A, the user may select the cell within region 510 that corresponds to estimated revenue amount of "$4,000" for the fourth line item. The user-interface view 500 may then transition to an updated user-interface view 501 of FIG. 5B, where the user may select an option within window 530 to edit the estimated revenue amount to a static amount (e.g., by selecting either (1) the "No revenue expected" option, which may set the estimated revenue amount for the fourth line item to $0, or (2) the "Manual entry" option, which may then enable the user to input a static amount).

One of ordinary skill in the art will appreciate that window 530 shown in FIG. 5B may take various forms, and the user may interact with user-interface views 500 and/or 501 in various other manners. Further, one of ordinary skill in the art will appreciate that the disclosed software application may enable a user to edit the initial estimated revenue amount for a given line item in various other manners as well.

At block 316, back-end platform 102 may then optionally receive, from the user's client station (e.g., client station 112), user input indicating a change to the estimated revenue amount for a given line item of the change event. Back-end platform 102 may receive such input at various times, such as after the user inputs a selection to edit the initial estimated revenue amount (e.g., by selecting the "Save" control button in window 530 to save the edited amount for the given line item).

In line with the discussion above, after the change event has been created, each line item of the change event may progress through various different stages that may be associated with more-firm cost amounts and/or more-firm revenue amounts, which may cause the most-firm cost amount and/or the most-firm revenue amount for each line item of the change event to change. Accordingly, in another aspect, after the change event has been created, back-end platform 102 may update the change event in various manners.

Figure 6:
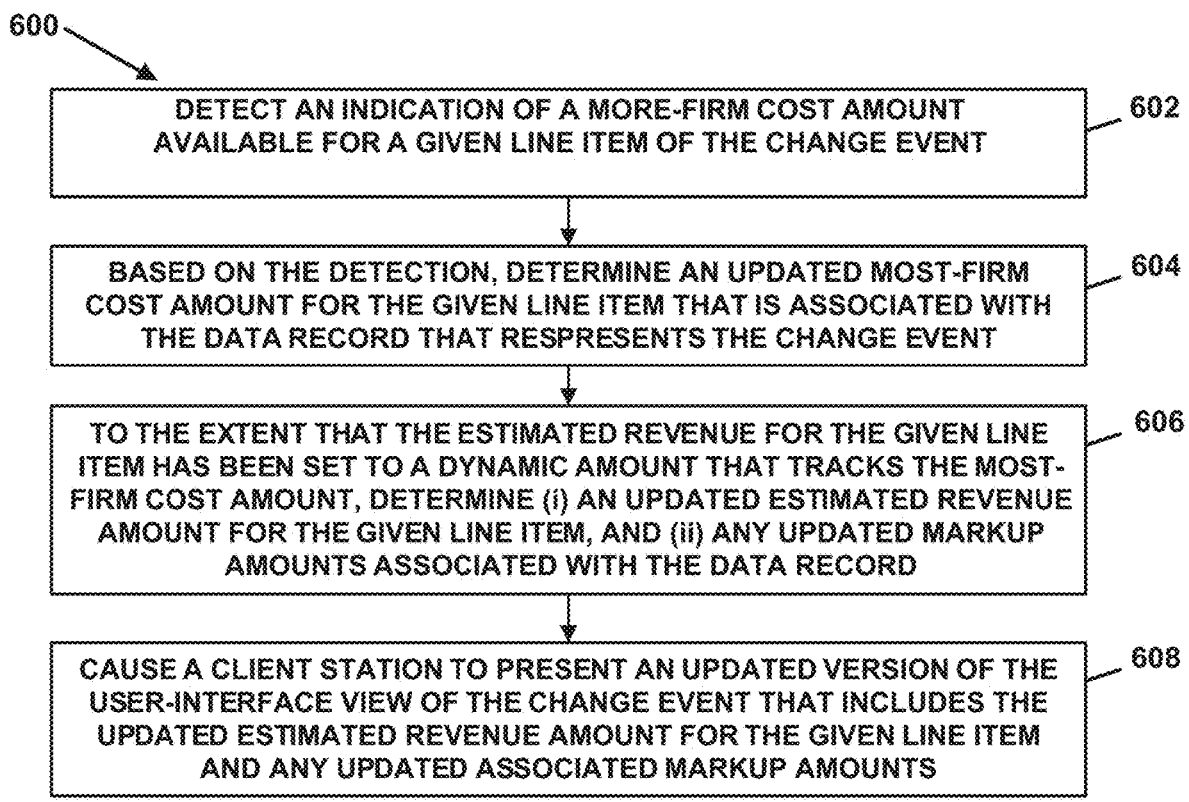
FIG. 6 depicts an example flow chart for updating a change event.

One example process for updating the change event based on the availability of a more-firm cost will now be described with reference to FIG. 6. For the purposes of illustration only, the example functions involved in the example process are described as being carried out by a back-end platform (e.g., back-end platform 102). However, it is possible that the responsibility for carrying out the functions of the disclosed process could be distributed between a back-end platform (e.g., back-end platform 102) and one or more client stations (e.g., client stations 112, 114, and/or 116). Further, it should be understood that the flow diagram in FIG. 6 is merely described in such manner for the sake of clarity and explanation and that some functions may be carried out in various other manners as well, including the possibility that example functions may be added, removed, rearranged into different orders, grouped together, and/or not grouped together at all.

According to an example implementation, the process for updating the change event based on the availability of a more-firm cost may begin at block 602, where back-end platform 102 may detect an indication of a more-firm cost amount available for a given line item of the change event. Back-end platform 102 may detect this indication at various times.

As one possibility, back-end platform 102 may detect the indication of the more-firm cost amount available for the given line item of the change event after receiving a bid in response to an RFQ that includes a quoted cost from a given potential subcontractor (e.g., an existing subcontractor on the project or possibly a new subcontractor) for completing the work activity that is the subject of the given line item, and the GC reviews, negotiates, and accepts the bid. For instance, the disclosed software application may enable a user employed by the GC to create the RFQ for the given line item via the "RFQ" tool and send the RFQ to each potential subcontractor. The disclosed software application may then enable each potential subcontractor to create, via the "RFQ" tool, a response to the RFQ that includes a quoted cost to complete the work activity that is the subject of the given line item. In turn, the disclosed software application may enable a user employed the GC (who may be the same user that created the RFQ or a different user) to review each RFQ response, negotiate with a given potential subcontractor, and accept a particular one of the received bids to pursue further (e.g., the bid having the lowest quoted cost). Back-end platform 102 may then detect the indication of the more-firm cost amount available for the given line item of the change event that represents the quoted cost amount associated with the bid after receiving a user request to view the more-firm cost amount available for the given line item of the change event (or perhaps in response to receiving the bid).

In practice, a user employed by the GC may access the "RFQ" tool to create and send the RFQ for the given line item in various manners. For instance, with reference to FIG. 5A, the user may access the "RFQ" tool by inputting an indication to create the RFQ for the given line item from drop-down menu 520, which may then trigger back-end platform 102 to cause the user's client station 112 to transition from user-interface view 500 to a user-interface view of the "RFQ" tool that may facilitate creating and sending the RFQ for the given line item.

As another possibility, back-end platform 102 may detect the indication of the more-firm cost amount available for the given line item of the change event after the GC enters into a new subcontract or amends an existing subcontract to complete the work activity that is the subject of the given line item with the subcontractor that submitted the selected bid. For instance, the disclosed software application may enable a user employed the GC to create or amend the subcontract between the GC and the subcontractor that establishes the commitment cost amount for the given line item that is more firm than both the estimated cost amount for the given line item and the RFQ cost amount for the given line item. Back-end platform 102 may then detect the indication of the more-firm cost amount available for the given line item of the change event that represents the commitment cost amount after receiving a user request to view the more-firm cost amount available for the given line item of the change event (or perhaps in response to receiving the commitment cost amount for the given line item).

Back-end platform 102 may receive the indication of the more-firm cost amount available for the given line item of the change event at various other times as well.

At block 604, based on the detected indication of the more-firm cost amount, back-end platform 102 may determine an updated most-firm cost amount for the given line item that is associated with the data record that represents the change event. Back-end platform 102 may determine the updated most-firm cost amount for the given line item in various manners.

As one possibility, after back-end platform 102 detects the indication of the more-firm cost amount available for the given line item of the change event that represents the quoted cost amount, back-end platform 102 may determine that (1) the RFQ cost field for the given line item should be set to the quoted cost amount, and (2) the most-firm cost field for the given line item should also be set to the quoted cost amount.

As another possibility, after back-end platform 102 detects the indication of the more-firm cost amount available for the given line item of the change event that represents the commitment cost amount, back-end platform 102 may determine that (1) the commitment cost field for the given line item should be set to the commitment cost amount, and (2) the most-firm cost field for the given line item should also be set to the commitment cost amount.

Back-end platform 102 may determine the updated most-firm cost amount for the given line item in various other manners as well.

Further, back-end platform 102 may determine the updated most-firm cost amount at various times as well. As one possibility, back-end platform 102 may determine the updated most-firm cost amount at the time back-end platform 102 receives a user request to view the most-firm cost for the given line item of the change event. As another possibility, back-end platform 102 may determine the updated most-firm cost amount at the time back-end platform 102 detects the indication of the more-firm cost amount available for the given line item of the change event. As yet another possibility, back-end platform 102 may determine the updated most-firm cost amount at the time back-end platform 102 receives a user request to export the change event and/or generate a report that includes the most-firm cost amount for the given line item of the change event. Back-end platform 102 may determine the updated most-firm cost amount at various other times as well.

At block 606, to the extent that the estimated revenue for the given line item has been set to a dynamic amount that tracks the most-firm cost amount for the given line item, back-end platform 102 may then also determine (i) an updated estimated revenue amount for the given line item, and (ii) any updated markup amounts associated with the data record that represents the change event. Back-end platform 102 may determine the updated estimated revenue amount for the given line item and any updated markup amount associated with the data record in various manners.

As one possibility, after back-end platform 102 determines that the most-firm cost field for the given line item should be set to the quoted cost amount, to the extent that the estimated revenue for the given line item has been set to a dynamic amount that tracks the most-firm cost amount for the given line item, back-end platform 102 may also determine that the updated estimated revenue amount for the given line item should represent the quoted cost amount. Back-end platform 102 may also determine any updated markup amounts should accordingly. For instance, back-end platform 102 may determine an updated estimated markup amount for a respective type of markup fee (e.g., insurance, profit, etc.) by (1) identifying the one or more markup rules that are specific to the respective type of markup fee, and then (2) applying the one or markup rules to the respective updated estimated revenue for each line item in the change evet that meets the markup rule's criteria (e.g., each line item having a given cost type), which may include the updated estimated revenue for the given line item, in order to derive the updated estimated markup amount for the respective type of markup fee. Back-end platform 102 may also determine an updated most-firm markup amount for the respective type of markup fee based on the updated estimated markup amount for the respective type of markup fee.

As another possibility, after back-end platform 102 determines that the most-firm cost field for the given line item should be set to the commitment cost amount, to the extent that the estimated revenue for the given line item has been set to a dynamic amount that tracks the most-firm cost amount for the given line item, back-end platform 102 may also determine that the updated estimated revenue amount for the given line item should represent the commitment cost amount. Back-end platform 102 may also determine any updated markup amount for a respective type of markup fee in a similar fashion as described above.

Back-end platform 102 may determine the updated estimated revenue amount for the given line item and any updated markup amount associated with the data record in various other manners as well.

Further, in line with the discussion above, back-end platform 102 may determine the updated estimated revenue amount and any updated markup amounts at various times as well, examples of which may include at the time back-end platform 102 receives a user request to view the most-firm revenue for the given line item of the change event, and/or at the time back-end platform 102 detects the indication of the more-firm cost amount available for the given line item of the change event, among other possibilities.

In turn, at block 608, back-end platform 102 may cause the client station to present an updated version of the user-interface view of the change event that includes the updated estimated revenue amount for the given line item and any updated associated markup amounts. This updated user-interface view of the change event may take various forms.

Figure 5C:
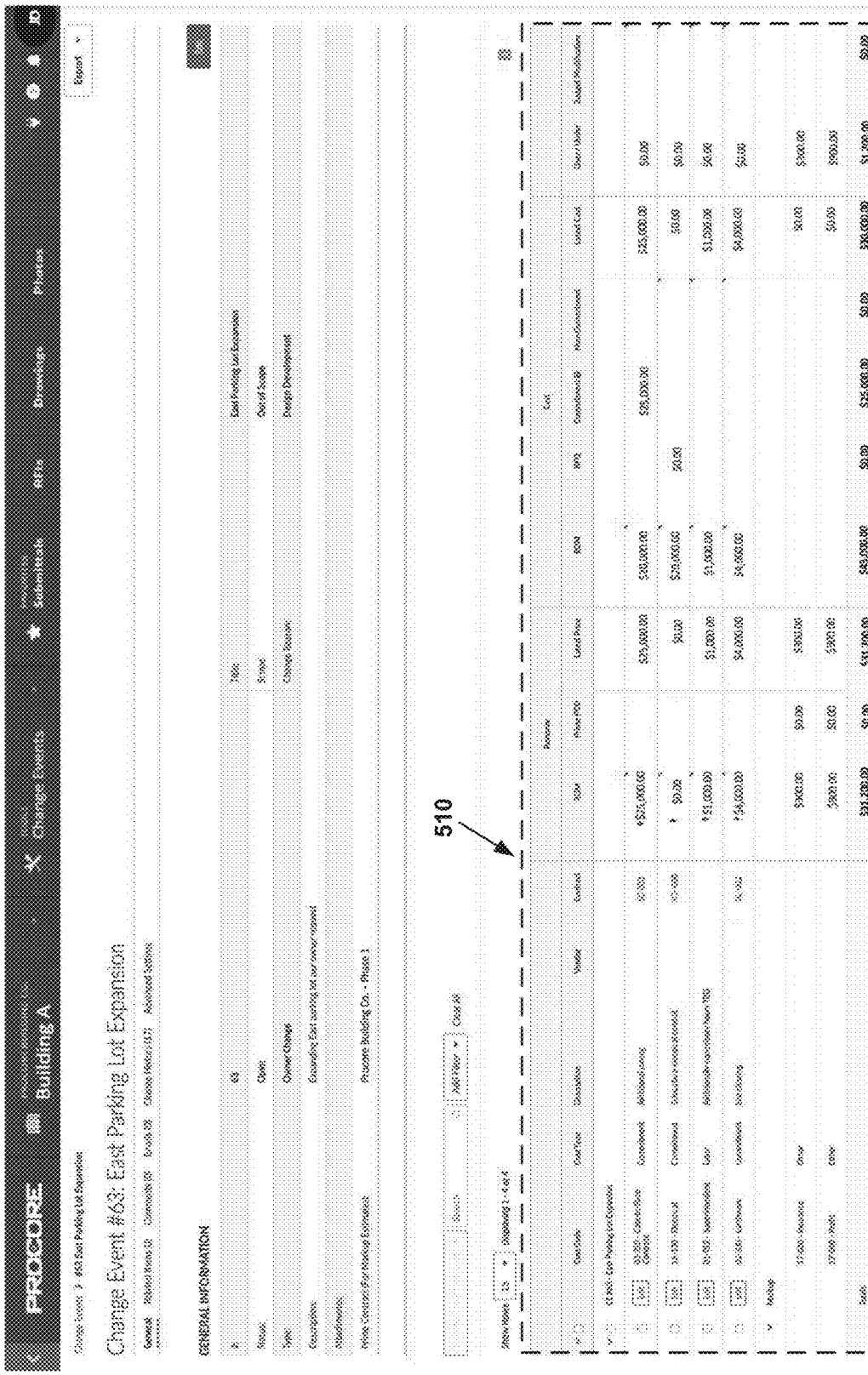
FIG. 5C depicts yet another example user-interface view of a change event that may be presented to a client station.

To illustrate, FIG. 5C depicts a user-interface view 502 that may be an updated version of user-interface view 500 of FIG. 5A. As shown in FIG. 5C, amounts associated with the fourth line item in region 510 of user-interface view 502 remain unchanged from region 510 of user-interface view 500, but some amounts associated with either the first line item, the second line item, or the third line item in region 501 of user-interface view 502 have been updated in various manners.

For example, with respect to the first line item, region 510 of user-interface view 502 shows that the "Commitment cost" field (which was previously not set to any amount) is presently set to "$25,000.00," which indicates that back-end platform 102 has updated the change event to include a commitment cost amount of "$25,000.00" for a subcontractor to complete the work activity that is the subject of the first line item. Accordingly, with respect to the first line item, region 510 also indicates that the "Latest Cost" field (which was previously set to "$20,000.00") is presently set to the most-firm cost amount of "$25,000.00." Further, given that the estimated revenue of the first line item in region 510 has been set to a dynamic amount that tracks the most-firm cost amount for the first line item (as indicated by the lightning bolt indicator to the left of the respective estimated revenue amount of the first line item), region 510 indicates that that "Revenue ROM" field (which was previously set to "$20,000.00") is presently set to "$25,000.00."

As another example, with respect to the second line item, region 510 shows that the "RFQ cost" field (which was previously not set to any amount) is presently set to "$0.00," which indicates that back-end platform 102 has updated the change event to include a quoted cost amount of "$0.00" from a potential subcontractor's bid to complete the work activity that is the subject of the second line item. Accordingly, with respect to the second line item, region 510 also indicates that the "Latest Cost" field (which was previously set to "$20,000.00") is presently set to the most-firm cost amount of "$0.00." Further, given that the estimated revenue of the second line item in region 510 has also been set to a dynamic amount that tracks the most-firm cost amount for the second line item, region 510 indicates that that "Revenue ROM" field (which was previously set to "$20,000.00") is presently set to "$0.00."

As yet another example, with respect to the third line item, region 510 shows that the "Cost ROM" field (which was previously set to "$0.00") is presently set to "$1,000.00," which indicates that back-end platform 102 has updated the change event to include an updated estimated cost amount of "$1,000.00" to complete the work activity that is the subject of the third line item. Accordingly, with respect to the third line item, region 510 also indicates that the "Latest Cost" field (which was previously set to "$0.00") is presently set to the most-firm cost amount of "$1,000.00." Further, given that the estimated revenue of the third line item in region 510 has also been set to a dynamic amount that tracks the most-firm cost amount for the third line item, region 510 indicates that that "Revenue ROM" field (which was previously set to "$0.00") is presently set to "$1,000.00."

As further shown in FIG. 5C, given that the respective estimated revenue has been updated for each of these three line items, region 510 shows that the "ROM" markup variable and the "Latest Price" markup variable have each been updated with respect to each type of markup fee associated with the change event.

For example, with respect to the type of markup fee labeled as "Insurance," region 510 shows that the "ROM" markup variable (which was previously set to "$440.00") is presently set to "$300.00." In line with the discussion above, back-end platform 102 may determine this markup amount by generating the estimated markup amount for each line item that includes a given cost type (e.g., either a labor or commitment cost type), and then aggregating the estimated markup amounts of these line items to derive the estimated markup amount of "$300.00" for the "ROM" markup variable associated with the type of markup fee labeled as "Insurance" (e.g., $25,000.00*0.01+$0.00*0.01+$1,000.0*0.01+$4,000.00*0.01). Given that the estimated markup amount associated with the type of markup fee labeled as "Insurance" has been updated to "$300.00," region 510 shows that the "Latest Price" markup variable (which was previously set to "$440.00") is also presently set to "$300.00."

As another example, with respect to the type of markup fee labeled as "Profit," region 510 shows that the "ROM" markup variable (which was previously set to "$1,320.00") is presently set to "$900.00." Back-end platform 102 may determine this markup amount in a similar fashion described above. Given that the estimated markup amount associated with the type of markup fee labeled as "Profit" has been updated to "$900.00," region 510 shows that the "Last Price" markup variable (which was previously set to "$1,320.00") is also presently set to "$900.00."

The updated version of the user-interface view of the change event may take various other forms as well.

Figure 7:
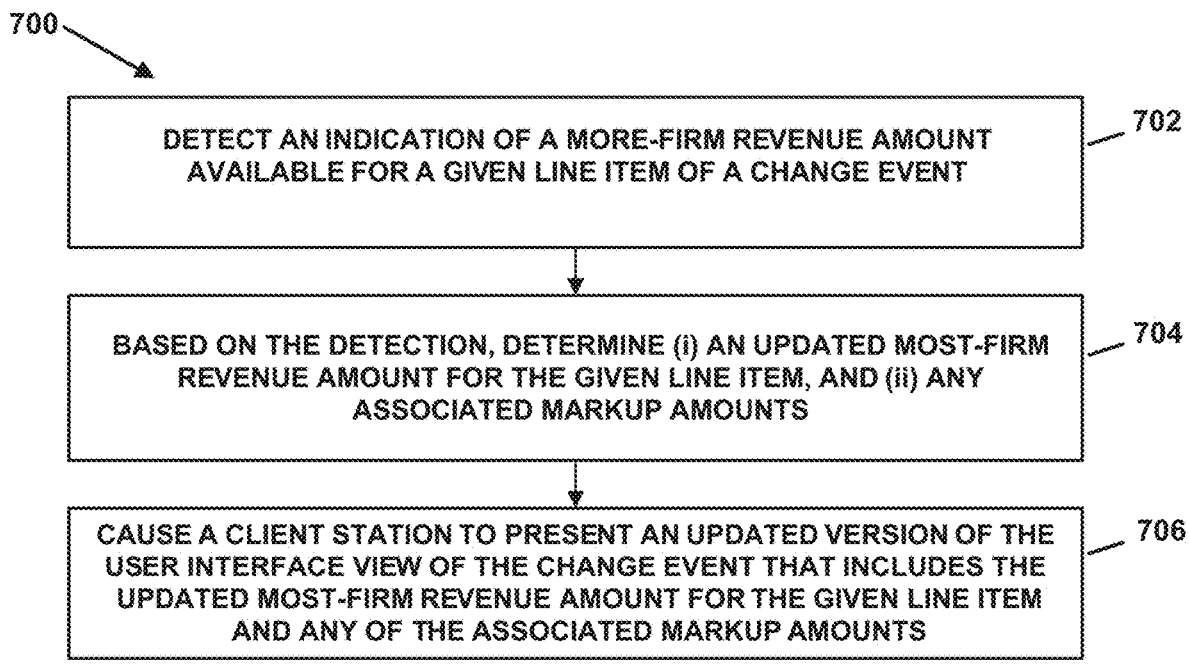
FIG. 7 depicts another example flow chart for updating a change event.

In accordance with the present disclosure, an example process for updating the change event based on the availability of a more-firm revenue will now be described with reference to FIG. 7. For the purposes of illustration only, the example functions involved in the example process are described as being carried out by a back-end platform (e.g., back-end platform 102). However, it is possible that the responsibility for carrying out the functions of the disclosed process could be distributed between a back-end platform (e.g., back-end platform 102) and one or more client stations (e.g., client stations 112, 114, and/or 116). Further, it should be understood that the flow diagram in FIG. 7 is merely described in such manner for the sake of clarity and explanation and that some functions may be carried out in various other manners as well, including the possibility that example functions may be added, removed, rearranged into different orders, grouped together, and/or not grouped together at all.

According to an example implementation, the process for updating the change event based on the availability of a more-firm revenue may begin at block 702, where back-end platform 102 may detect an indication of a more-firm revenue amount available for a given line item of the change event. Back-end platform 102 may detect this indication at various times.

As one possibility, back-end platform 102 may detect the indication of the more-firm revenue amount available for the given line item of the change event after back-end platform 102 detects the indication of the more-firm cost amount for the given line item of the change event, after back-end platform 102 determines the updated estimated revenue amount for the given line item, and/or after back-end platform 102 receives a request to present the updated estimated revenue amount for the given line item as described above with reference to FIG. 6. In this respect, the more-firm revenue amount available for the given line item may represent the updated estimated revenue amount for the given line item.

As another possibility, back-end platform 102 may detect the indication of the more-firm revenue amount available for the given line item of the change event after a change order that describes the details for completing the work activity that is the subject of the given line item has been created. For instance, the disclosed software application may enable a user employed by the GC to create, via the "Change Order" tool, the change order for the given line item that includes the change order revenue for the given line item. Back-end platform 102 may then eventually detect the indication of the more-firm revenue amount available for the given line item of the change event that represents the change order revenue amount for completing the work activity that is the subject of the given line item.

As yet another possibility, back-end platform 102 may detect the indication of the more-firm revenue amount available for the given line item of the change event after the change order has been approved. For instance, the disclosed software application may enable a user employed by the GC (who may be the same user that created the change order or a different user employed by the GC) to send, via the "Change Order" tool, the change order to the client of the project and/or another user employed by the client (e.g., an architect and/or engineer employed by the client) for approval. After the change order has been approved, back-end platform 102 may then detect the indication of the more-firm revenue amount available for the given line item of the change event that represents the approved change order revenue amount for completing the work activity that is the subject of the given line item.

In practice, a user employed by the GC may access the "Change Order" tool to create and/or send the change order that includes the given line item in various manners. For instance, with reference to FIG. 5A, the user may access the "Change Order" tool by inputting an indication to create the change order for the given line item from drop-down menu 520, which may then trigger back-end platform 102 to cause the user's client station 112 to transition from user-interface view 500 to a user-interface view of the "Change Order" tool that may facilitate creating and/or sending the change order for the given line item.

Generally speaking, the user may interact with the user-interface view of the "Change Order" tool in various manners. For example, the user may interact with the user-interface view of the change order to (1) add a subset of line items included as part of the change event (e.g., the given line item and perhaps one or more other line items) to the change order, and (2) for each line item added to the change order, assign a respective change order revenue amount for completing the work activity that is the subject of the line item. As another example, the user may interact with the user-interface view of the "Change Order" tool to modify one or more markup rules that are specific to a respective type of markup fee associated with a given line item added to the change order. For instance, the user may interact with the user-interface view to input an indication to modify the markup percentage for a respective type of markup fee associated with a given line item added to the change order.

One of ordinary skill in the art will appreciate that the user may interact with the user-interface view of the "Change Order" tool in various other manners as well.

Further, one of ordinary skill in the art will appreciate that back-end platform 102 may detect the indication of the more-firm revenue available for the given line item of the change event at various other times as well.

At block 704, based on detecting the indication of the more-firm revenue amount available for the given line item of the change event, back-end platform 102 may determine (i) an updated most-firm revenue amount for the given line item and (ii) any associated markup amounts. Back-end platform 102 may determine the updated most-firm revenue amount for the given line item in various manners.

As one possibility, after back-end platform 102 detects the indication of the more-firm revenue amount available for the given line item of the change event that represents the updated estimated revenue amount for the given line item, back-end platform 102 may determine that the estimated revenue field and the most-firm revenue field (e.g., the "Latest Price" revenue field) for the given line item should each be set to the updated estimated revenue amount.

As another possibility, after back-end platform 102 detects the indication of the more-firm revenue amount available for the given line item of the change event that represents the change order revenue amount for completing the work activity that is the subject of the given line item, back-end platform 102 may determined that (1) the change order revenue field (e.g., the "Prime PCO" revenue" field) for the given line item should be set to this change order revenue amount, and/or (2) the most-firm revenue field (e.g., the "Latest Price" revenue field) for the given line item should be set to this change order revenue amount.

As yet another possibility, after back-end platform 102 detects the indication of the more-firm revenue amount available for the given line item of the change event that represents the approved change order revenue amount for completing the work activity that is the subject of the given line item, back-end platform 102 may determine that (1) the change order revenue field (e.g., the "Prime PCO" revenue" field) for the given line item should be set to this approved change order revenue amount, and/or (2) the most-firm revenue field (e.g., the "Latest Price" revenue field) for the given line item should be set to this approved change order revenue amount.

Back-end platform 102 may determine the updated most-firm revenue amount for the given line item in various manners.

Further, back-end platform 102 may determine any associated markup amounts accordingly. For example, back-end platform 102 may determine the change order markup amount for a respective type of markup fee (e.g., profit) in various manners. As one possibility, back-end platform 102 may determine the change order markup amount for the respective type of markup fee (e.g., profit) by (1) identifying the one or more markup rules that are specific to (i) the respective type of markup fee and (ii) a given change order that includes one or more line items of the data record, and then (2) applying the one or more markup rules to the respective change order revenue for each line item included in the given change order in order to derive the change order markup amount for the respective type of markup fee. For instance, back-end platform 102 may identify a markup rule that is specific to the respective type of markup fee (e.g., profit) and a given change order that includes one or more line items of the data record, where the markup rule may comprise a given markup percentage (e.g., 1.5%) that is applied to the respective change order revenue for each line item included in the given change order to generate a change order markup amount for each line item included in the given change order. Back-end platform 102 may then aggregate the change order markup amounts of such line items to derive the change order markup amount for the respective type of markup fee.

Back-end platform 102 may determine the change order markup amount for the respective type of markup fee (e.g., profit) in various other manners as well.

As another example, back-end platform 102 may determine an updated most-firm markup amount for a respective type of markup fee (e.g., profit) in various manners. As one possibility, back-end platform 102 may determine the updated most-firm markup amount for the respective type of markup fee (e.g., profit) by (1) identifying the most-firm markup amount for each individual line item, which could either be the estimated markup amount or the change order markup amount (or possibly some other most-firm markup amount), and (2) aggregating the most-firm markup amounts of the line items to derive the updated most-firm markup amount for the respective type of markup fee.

Back-end platform 102 may determine the updated most-firm markup amount for the respective type of markup fee (e.g., profit) in various other manners as well.

In line with the discussion above, it should be understood that back-end platform 102 may determine the updated most-firm revenue amount for the given line item and any associated markup amounts at various times as well, examples of which may include at the time back-end platform 102 receives a user request to view the most-firm revenue for the given line item of the change event, and/or at the time back-end platform 102 detects the indication of the more-firm revenue amount available for the given line item of the change event, among other possibilities.

In turn, at block 706, back-end platform 102 may cause a user's client station (e.g., client station 112) to present an updated version of the user-interface view of the change event that includes the updated most-firm revenue amount for the given line item and any associated markup amounts. This updated version of the user-interface view may take various forms.

Figure 5D:
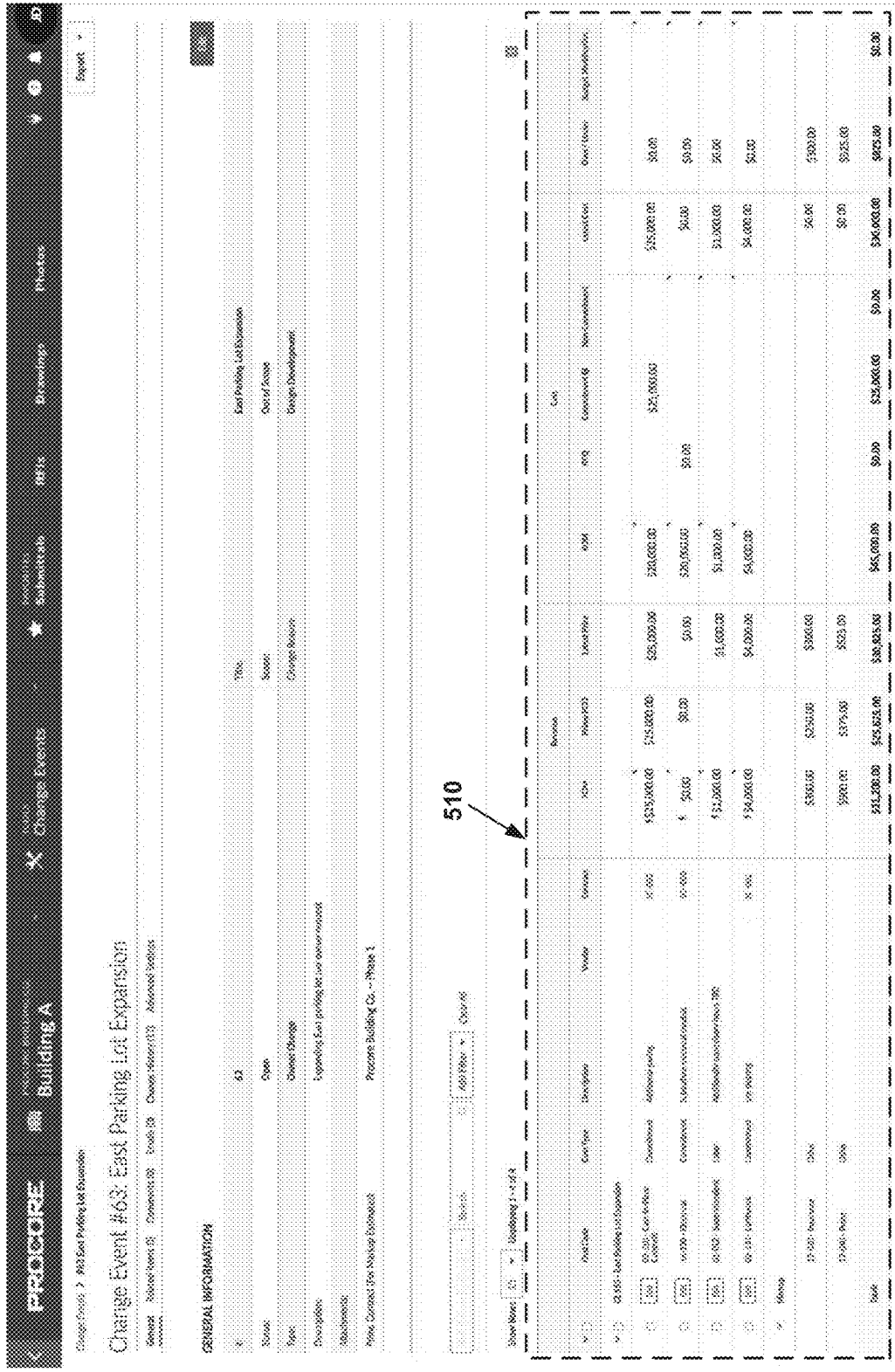
FIG. 5D depicts still another example user-interface view of a change event that may be presented to a client station.

To illustrate, FIG. 5D depicts a user-interface view 503 that may be an updated version of user-interface view 502 of FIG. 5C. As shown in FIG. 5D, amounts in region 510 associated with either the third line item or fourth line item remain unchanged, but some amounts in region 510 associated with either the first line item or the second line item have been updated in various manners.

For example, with respect to the first line item, region 510 shows that the "Prime PCO revenue" field (which was previously not set to any amount) is presently set to "$25,000.00," which indicates that back-end platform 102 has updated the data record to include a change order revenue amount of "$25,000.00" for completing the work activity that is the subject of the first line item. Accordingly, with respect to the first line item, region 510 also indicates that the "Latest Price" revenue field is presently set to the most-firm revenue amount of "$25,000.00."

As another example, with respect to the second line item, region 510 shows that the "Prime PCO revenue" field (which was previously not set to any amount) is presently set to "$0.00," which indicates that back-end platform 102 has updated the data record to include a change order revenue amount of "$0.00" for completing the work activity that is the subject of the second line item (which may be the same change order that includes the first line item or a different change order). Accordingly, with respect to the second line item, region 510 also indicates that the "Latest Price" revenue field is presently set to the most-firm revenue amount of "$0.00."

As further shown in FIG. 5D, given that the change order revenue has been updated for the first line item and the second line item, region 510 shows that the "Prime PCO" markup variable (which represents the change order markup variable) has been updated with respect to each type of markup fee included as part of the data record.

For example, with respect to the type of markup fee labeled as "Insurance," region 510 shows that the "Prime PCO" markup variable (which was previously set to "$0.00") is presently set to "$250.00." In line with the discussion above, back-end platform 102 may determine this markup amount by generating the change order markup amount for each line item that was included in a given change order, and then aggregating the change order markup amounts of such line items to derive the change order markup amount for the respective type of markup fee. For instance, back-end platform 102 may identify a markup rule that is specific to the respective type of markup fee labeled as "Insurance" and a change order that includes one or more line items of the data record (e.g., the first line item and the second line item in region 510), where the markup rule may comprise a given markup percentage (e.g., 1%) that is applied to the change order revenue for each line item included in the change order to generate a change order markup amount for each line item included in the change order. Back-end platform 102 may then aggregate the respective change order markup amounts of such line items (e.g., the first line item and the second line item in region 510) to derive the change order markup amount of "$250.00" for the "Prime PCO" markup variable associated with the respective type of markup fee labeled as "Insurance" (e.g., $25,000*0.01+$0.00*0.01).

As another example, with respect to the type of markup fee labeled as "Profit," region 510 shows that the "Prime PCO" markup variable (which was previously set to "$0.00") is presently set to "$375.00." Back-end platform 102 may determine this markup amount by generating the change order markup amount for each line item that was included in a given change order, and then aggregating the change order markup amounts of such line items to derive the change order markup amount for the respective type of markup fee. For instance, back-end platform 102 may identify a markup rule that is specific to the respective type of markup fee labeled as "Profit" and a change order that includes one or more line items of the data record (e.g., the first line item and the second line item in region 510), where the markup rule may comprise a given markup percentage (e.g., 1.5%) that is applied to the change order revenue for each line item included in the change order to generate a change order markup amount for each line item included in the change order. Back-end platform 102 may then aggregate the respective change order markup amounts of such line items (e.g., the first line item and the second line item in region 510) to derive the change order markup amount of "$375.00" for the "Prime PCO" markup variable associated with the respective type of markup fee labeled as "Profit" (e.g., $25,000*0.015+$0.00*0.015).

As shown in FIG. 5D, the change order revenue amount for the first line item and the estimated revenue amount for the first line item are the same. Likewise, the change order revenue amount for the second line item and the estimated revenue amount for the second line item are the same. However, with respect to the type of markup fee labeled as "Profit," the most-firm markup amounts for the first and second line items have changed as result of applying the given markup percentage specific to the change order that includes the first and second line items (e.g., 1.5%) to the respective change order revenues of the first and second line items, which is different than the given markup percentage (e.g., 3%) that was applied to the respective estimated revenues of the first and second line items. Accordingly, with respect to the type of markup fee labeled as "Profit," region 510 shows that the "Latest Price" markup variable (which was previously set to "$900.00") is presently set to "$525.00." In line with the discussion above, to determine this markup amount, back-end platform 102 may aggregate the most-firm markup amounts for the four line items included in the data record (e.g., $25,000*0.015+ $0.00*0.015+$1,000*3%+$1,000*3%).

In contrast, as shown in FIG. 5D, with respect to the type of markup fee labeled as "Insurance," region 510 shows that the "Latest Price" markup variable is presently set to "$300.00," which remains unchanged from user-interface view 502 of FIG. 5C, because (1) the change order revenue amount for the first line item and the estimated revenue amount for the first line item are the same, (2) the change order revenue amount for the second line item and the estimated revenue amount for the second line item are the same, and (3) the most-firm markup amounts of all four line items remain unchanged. In particular, with respect to the type of markup fee labeled as "Insurance," the respective most-firm markup amounts for the first and second line items may remain unchanged as result of applying the given markup percentage specific to the change order that includes the first and second line items (e.g., 1%) to the respective change order revenues of the first and second line items, which is the same as the given markup percentage (e.g., 1%) that was applied to the respective estimated revenues of the first and second line items.

The updated version of the user-interface view of the change event may take various other forms as well.

In accordance with the present disclosure, the disclosed software application may function to track the impact of other change events on the overall budget for the construction project in a similar manner described above. In turn, in another aspect, the disclosed software application may function to provide an up-to-date estimate of the overall budget for the construction project. For instance, for each change event created for the construction project, the most-firm cost amount and the most firm revenue amount for each line item of the change event (and/or perhaps the estimated revenue amount for each line item and markup amounts) may serve as input to a "Budgeting" tool of the disclosed software application, which may be used to provide an up-to-date estimate of the overall budget for the construction project. In line with the discussion above, the overall budget for the construction project may be updated dynamically as a most-firm cost amount and/or a most-firm revenue amount for a given line item of a given change event becomes available.

IV. CONCLUSION

Example embodiments of the disclosed innovations have been described above. Those skilled in the art will understand, however, that changes and modifications may be made to the embodiments described without departing from the true scope and spirit of the present invention, which will be defined by the claims.

Further, to the extent that examples described herein involve operations performed or initiated by actors, such as "humans," "operators," "users," "parties," or other entities, this is for purposes of example and explanation only. Claims should not be construed as requiring action by such actors unless explicitly recited in claim language.

The invention claimed is:

1. A computing device comprising:
   a user interface;
   a network interface;
   at least one processor;
   at least one non-transitory computer-readable medium; and
   program instructions stored on the at least one non-transitory computer-readable medium that are executable by the at least one processor such that the computing device is configured to:
      display, via the user interface, one or more data fields for creating a new change event associated with a given construction project;
      receive, via the user interface, user input defining a given change event that includes an indication that an estimated revenue for a first line item of the given change event is to be dynamically updated to track a latest cost for the first line item, wherein the latest cost represents a currently available, most-firm cost for the first line item;
      based on the user input, cause storage of a data record that represents the given change event, the data record indicating (i) the estimated revenue for the first line item of the given change event and (ii) that the estimated revenue for the first line item of the given change event is to be dynamically updated to track the latest cost for the first line item;
      determine a change to at least one other data record associated with the given construction project;
      based on the change to the at least one other data record, determine that the latest cost for the first line item should be updated;
      identify a new latest cost for the first line item;
      based on identifying the new latest cost for the first line item:
         dynamically update the latest cost for the first line item to reflect the new latest cost; and
         dynamically update the estimated revenue for the first line item to track the latest cost; and
      display, via the user interface, a visualization of the given change event that includes at least an updated estimated revenue and an updated latest cost.

2. The computing device of claim 1, wherein the user input defining the given change event designates the given change event as out of scope, the computing device further comprising program instructions stored on the at least one non-transitory computer-readable medium that are executable by the at least one processor such that the computing device is configured to:
   dynamically update the estimated revenue to track the latest cost for the first line item based on the user input designating the given change event as out of scope.

3. The computing device of claim 1, further comprising program instructions stored on the at least one non-transitory computer-readable medium that are executable by the at least one processor such that the computing device is configured to:
   determine an estimated markup amount for each respective type of markup fee that applies to the given change event by:
      identifying a markup rule that is specific to the respective type of markup fee; and
      applying the markup rule to a respective estimated revenue for each line item of the given change event that meets criteria of the markup rule in order to derive the estimated markup amount for the respective type of markup fee.

4. The computing device of claim 3, wherein the markup rule comprises a given markup percentage that is to be applied to the respective estimated revenue for each line item of the given change event that includes a given cost type that identifies a type of cost to be incurred when performing work activity that is a subject of the line item.

5. The computing device of claim 1, further comprising program instructions stored on the at least one non-transitory computer-readable medium that are executable by the at least one processor such that the computing device is configured to:
   determine a change order markup amount for each respective type of markup fee that applies to the given change event by:
      identifying a markup rule that is specific to the respective type of markup fee and a given change order that includes one or more line items of the given change event; and
      applying the markup rule to a respective change order revenue for each line item included in the given change order and thereby deriving the change order markup amount for the respective type of markup fee.

6. The computing device of claim 1, further comprising program instructions stored on the at least one non-transitory computer-readable medium that are executable by the at least one processor such that the computing device is configured to:
   determine a latest markup amount for each respective type of markup fee that applies to the given change event by:
      identifying a respective latest markup amount for each line item included in the given change event, wherein the respective latest markup amount for each line item comprises either (1) a change order markup amount for the line item, or (2) an estimated markup amount for the line item; and
      aggregate the respective latest markup amounts for the line items included in the given change event and thereby derive the latest markup amount for the respective type of markup fee.

7. The computing device of claim 1, wherein the new latest cost for the first line item comprises a quoted cost to complete work activity that is a subject of the first line item, and wherein the updated latest cost for the first line item comprises an amount corresponding to the quoted cost.

8. The computing device of claim 1, wherein the new latest cost for the first line item comprises a commitment cost associated with a subcontract for completing work activity that is a subject of the first line item, and wherein the updated latest cost for the first line item comprises an amount corresponding to the commitment cost.

9. The computing device of claim 1, wherein the user input defining the given change event includes an estimated cost to complete work activity that is a subject of the first line item, and wherein the latest cost for the first line item comprises the estimated cost for the first line item.

10. The computing device of claim 1, further comprising program instructions stored on the at least one non-transitory computer-readable medium that are executable by the at least one processor such that the computing device is configured to:
   receive user input indicating that a latest revenue for the first line item is to be dynamically updated to track the estimated revenue;

based on dynamically updating the estimated revenue for the first line item to track the latest cost, determine that a new latest revenue is available for the first line item; and based on determining that the new latest revenue is available for the first line item, dynamically update the latest revenue for the first line item to track the new latest revenue.

11. A non-transitory computer-readable medium, wherein the non-transitory computer-readable medium is provisioned with program instructions that, when executed by at least one processor, cause a computing device to:

display, via a user interface of computing device, one or more data fields for creating a new change event associated with a given construction project;

receive, via the user interface, user input defining a given change event that includes an indication that an estimated revenue for a first line item of the given change event is to be dynamically updated to track a latest cost for the first line item, wherein the latest cost represents a currently available, most-firm cost for the first line item;

based on the user input, cause storage of a data record that represents the given change event, the data record indicating (i) the estimated revenue for the first line item of the given change event and (ii) that the estimated revenue for the first line item of the given change event is to be dynamically updated to track the latest cost for the first line item;

determine a change to at least one other data record associated with the given construction project;

based on the change to the at least one other data record, determine that the latest cost for the first line item should be updated;

identify a new latest cost available for the first line item;

based on identifying the new latest cost for the first line item:

dynamically update the latest cost for the first line item to reflect the new latest cost; and dynamically update the estimated revenue for the first line item to track the latest cost; and display, via the user interface, a visualization of the given change event that includes at least an updated estimated revenue and an updated latest cost.

12. The non-transitory computer-readable medium of claim 11, wherein the user input defining the given change event designates the given change event as out of scope, and wherein the non-transitory computer-readable medium is also provisioned with program instructions that, when executed by at least one processor, cause the computing device to:

dynamically update the estimated revenue to track the latest cost for the first line item based on the user input designating the given change event as out of scope.

13. The non-transitory computer-readable medium of claim 11, wherein the non-transitory computer-readable medium is also provisioned with program instructions that, when executed by at least one processor, cause the computing device to:

determine an estimated markup amount for each respective type of markup fee that applies to the given change event by:

identifying a markup rule that is specific to the respective type of markup fee; and applying the markup rule to a respective estimated revenue for each line item of the given change event that meets criteria of the markup rule in order to derive the estimated markup amount for the respective type of markup fee.

14. The non-transitory computer-readable medium of claim 13, wherein the markup rule comprises a given markup percentage that is to be applied to the respective estimated revenue for each line item of the given change event that includes a given cost type that identifies a type of cost to be incurred when performing work activity that is a subject of the line item.

15. The non-transitory computer-readable medium of claim 11, wherein the non-transitory computer-readable medium is also provisioned with program instructions that, when executed by at least one processor, cause the computing device to:

determine a change order markup amount for each respective type of markup fee that applies to the given change event by:

identifying a markup rule that is specific to the respective type of markup fee and a given change order that includes one or more line items of the given change event; and applying the markup rule to a respective change order revenue for each line item included in the given change order and thereby deriving the change order markup amount for the respective type of markup fee.

16. The non-transitory computer-readable medium of claim 11, wherein the non-transitory computer-readable medium is also provisioned with program instructions that, when executed by at least one processor, cause the computing device to:

determine a latest markup amount for each respective type of markup fee that applies to the given change event by:

identifying a respective latest markup amount for each line item included in the given change event, wherein the respective latest markup amount for each line item comprises either (1) a change order markup amount for the line item, or (2) an estimated markup amount for the line item; and aggregate the respective latest markup amounts for the line items included in the given change event and thereby derive the latest markup amount for the respective type of markup fee.

17. A method carried out by a computing device, the method comprising:

displaying, via a user interface of the computing device, one or more data fields for creating a new change event associated with a given construction project;

receiving, via the user interface, user input defining a given change event that includes an indication that an estimated revenue for a first line item of the given change event is to be dynamically updated to track a latest cost for the first line item, wherein the latest cost represents a currently available, most-firm cost for the first line item;

based on the user input, causing storage of a data record that represents the given change event, the data record indicating (i) the estimated revenue for the first line item of the given change event and (ii) that the estimated revenue for the first line item of the given change event is to be dynamically updated to track the latest cost for the first line item;

determining a change to at least one other data record associated with the given construction project;

based on the change to the at least one other data record, determining that the latest cost for the first line item should be updated;

identifying a new latest cost for the first line item;

based on identifying the new latest cost for the first line item:

dynamically updating the latest cost for the first line item to reflect the new latest cost; and dynamically updating the estimated revenue for the first line item to track the latest cost; and displaying, via the user interface, a visualization of the given change event that includes at least an updated estimated revenue and an updated latest cost.

18. The method of claim 17, wherein the user input defining the given change event designates the given change event as out of scope, the method further comprising:

dynamically updating the estimated revenue to track the latest cost for the first line item based on the user input designating the given change event as out of scope.

19. The method of claim 17, further comprising:

determining an estimated markup amount for each respective type of markup fee that applies to the given change event by:

identifying a markup rule that is specific to the respective type of markup fee; and applying the markup rule to a respective estimated revenue for each line item of the given change event that meets criteria of the markup rule in order to derive the estimated markup amount for the respective type of markup fee.

20. The method of claim 19, wherein the markup rule comprises a given markup percentage that is to be applied to the respective estimated revenue for each line item of the given change event that includes a given cost type that identifies a type of cost to be incurred when performing work activity that is a subject of the line item.

* * * * *